US012655307B2

(12) United States Patent
Tanino et al.

(10) Patent No.: US 12,655,307 B2
(45) Date of Patent: Jun. 16, 2026

(54) SURFACE-PROTECTIVE COATING MATERIAL COMPOSITION

(71) Applicant: CHUGOKU MARINE PAINTS, LTD., Otake (JP)

(72) Inventors: Soichiro Tanino, Otake (JP); Junnai Ikadai, Otake (JP); Yoshihiko Imai, Otake (JP); Akino Nabe, Otake (JP); Masamitsu Okada, Otake (JP)

(73) Assignee: CHUGOKU MARINE PAINTS, LTD., Otake (JP)

( * ) Notice: Subject to any disclaimer, the term of this patent is extended or adjusted under 35 U.S.C. 154(b) by 585 days.

(21) Appl. No.: 18/027,483

(22) PCT Filed: Sep. 22, 2021

(86) PCT No.: PCT/JP2021/034663
§ 371 (c)(1),
(2) Date: Mar. 21, 2023

(87) PCT Pub. No.: WO2022/065323
PCT Pub. Date: Mar. 31, 2022

(65) Prior Publication Data

US 2024/0018368 A1 Jan. 18, 2024

(30) Foreign Application Priority Data

Sep. 25, 2020 (JP) ................................ 2020-160954

(51) Int. Cl.
*C09D 5/16* (2006.01)
*C09D 7/61* (2018.01)
*C09D 167/04* (2006.01)

(52) U.S. Cl.
CPC ......... *C09D 5/1618* (2013.01); *C09D 5/1662* (2013.01); *C09D 7/61* (2018.01); *C09D 167/04* (2013.01)

(58) Field of Classification Search
None
See application file for complete search history.

(56) References Cited

U.S. PATENT DOCUMENTS

| | | | | |
|---|---|---|---|---|
| 4,096,125 | A * | 6/1978 | Smith .................... | C08G 63/08 525/437 |
| 4,501,829 | A | 2/1985 | Oda et al. | |
| 2009/0068473 | A1 | 3/2009 | Van Wessel | |
| 2013/0102708 | A1 | 4/2013 | Niimoto et al. | |
| 2015/0044450 | A1 | 2/2015 | Yuasa et al. | |
| 2016/0185913 | A1 | 6/2016 | Zhang et al. | |

FOREIGN PATENT DOCUMENTS

| | | | |
|---|---|---|---|
| EP | 3633001 | A1 | 4/2020 |
| JP | H04230201 | A | 8/1992 |
| JP | H0753899 | A | 2/1995 |
| JP | H07-109339 | A | 4/1995 |
| JP | H10-259240 | A | 9/1998 |
| JP | H11-199826 | A | 7/1999 |
| JP | 2000327953 | A | 11/2000 |
| JP | 2004196957 | A | 7/2004 |
| JP | 2004300410 | A | 10/2004 |
| JP | 2007238896 | A | 9/2007 |
| JP | 2009515019 | A | 4/2009 |
| JP | 2013129724 | A | 7/2013 |
| WO | WO-2011162359 | | 12/2011 |
| WO | WO-2013133284 | A1 | 9/2013 |
| WO | WO-2018221289 | A1 | 12/2018 |

OTHER PUBLICATIONS

Office Action issued Mar. 6, 2024, in corresponding Australian Patent Application No. 2021348788, 8 pages.
Extended European Search Report issued Sep. 27, 2024 in European Patent Application No. 21872452.4, 6 pages.
Combined Chinese Office Action and Search Report issued Mar. 28, 2024 in corresponding Chinese Patent Application No. 202180064608.9 (with English translation), 14 pages.
Office Action issued Dec. 19, 2023 in corresponding Japanese Patent Application No. 2022-552006 (with English translation), 6 pages.
International Search Report issued Dec. 7, 2021 in PCT/JP2021/034663 (with English translation), 5 pages.
Written Opinion issued Dec. 7, 2021 in PCT/JP2021/034663 (with English translation), 6 pages.

* cited by examiner

*Primary Examiner* — Robert T Butcher
(74) *Attorney, Agent, or Firm* — Element IP, PLC

(57) ABSTRACT

Provided is a surface-protective coating composition capable of forming a surface-protective coating film in which the occurrence of cracks is suppressed during the formation of the coating film, while using a polymer having marine biodegradability. Also provided are: a surface-protective coating film formed from the surface-protective coating composition; a substrate with a surface-protective coating film, which is coated with the surface-protective coating film, and a method of producing the same; and a surface protection method using the surface-protective coating film. The surface-protective coating composition according to the present invention contains a polycaprolactone-based polymer (A) and a zinc oxide (B), wherein the polycaprolactone-based polymer (A) has an acid value of 5 mgKOH/g or more and 200 mgKOH/g or less, and a structural unit derived from caprolactone in the polycaprolactone-based polymer (A) has a content of 50% by mass or more and 99.5% by mass or less.

12 Claims, No Drawings

SURFACE-PROTECTIVE COATING MATERIAL COMPOSITION

TECHNICAL FIELD

The present invention relates to a surface-protective coating composition, and a surface-protective coating film, a substrate with a surface-protective coating film, a method of producing a substrate with a surface coating film, and a surface protection method formed by using the surface-protective coating composition.

BACKGROUND ART

At present, environmental problems due to the influx of plastics into the ocean are becoming more serious. On the other hand, the most common method of protecting the surface of man-made structures is to use a coating film. However, normally, the coating film contains a large amount of organic polymers, and thus there is a risk that the peeling off of coating film pieces due to accidental mechanical damage to the coating film may potentially become a source of plastic influx (hereinafter also referred to as marine plastics) into the ocean.

Examples of a countermeasure against marine plastics include the use of marine biodegradable polymers that are decomposed and digested by living organisms in the environment and eventually decompose into carbon dioxide.

Polycaprolactone is an example of a synthetic polymer that is expected to be compatible with the marine biodegradation. For example, coating compositions such as those disclosed in PTLs 1 and 2 are known.

CITATION LIST

Patent Literature

PTL 1: JPH 07-109339 A
PTL 2: JPH 10-259240 A

SUMMARY OF INVENTION

Technical Problem

However, polycaprolactone-based polymers such as those described in PTLs 1 and 2 above, in particular, those having a higher ratio of structural units derived from caprolactone were more likely to have problems in film-forming property and coating film strength such as the occurrence of cracks in a coating film formed by a coating composition containing the polymer.

An object of the present invention is to provide a surface-protective coating composition capable of forming a surface-protective coating film in which the occurrence of cracks is suppressed during the formation of the coating film, while using a polymer having marine biodegradability.

Furthermore, an object of the present invention is to provide a surface-protective coating film formed from the surface-protective coating composition; a substrate with a surface-protective coating film, which is coated with the surface-protective coating film, and a method of producing the same; and a surface protection method using the surface-protective coating film.

In the present invention, the "surface-protective coating film" only needs to have a function of protecting the surface of a substrate by forming the coating film on the surface of the substrate. The "surface protective coating film" is not particularly limited in its aspect, and has a wide variety of forms, such as, specifically, a surface-protective coating film that protects the surface by suppressing the adhesion of aquatic organisms to the surface, a surface-protective coating film that protects the substrate surface from scratches, and a surface-protective coating film that improves the weather resistance of the substrate surface.

Solution to Problem

As a result of intensive studies by the present inventors, the present inventors have found that the above problems can be solved by the following configuration, thus completing the present invention.

The configuration of the present invention is as follows.

<1> A surface-protective coating composition containing a polycaprolactone-based polymer (A) and a zinc oxide (B), wherein the polycaprolactone-based polymer (A) has an acid value of 5 mgKOH/g or more and 200 mgKOH/g or less, and a structural unit derived from caprolactone in the polycaprolactone-based polymer (A) has a content of 50% by mass or more and 99.5% by mass or less.

<2> The surface-protective coating composition according to <1>, wherein, in polymer components contained in the surface-protective coating composition, the polycaprolactone polymer (A) has a content of 50% by mass or more.

<3> The surface-protective coating composition according to <1> or <2>, wherein the polycaprolactone-based polymer (A) is a polymer obtained by a polymerization reaction of ε-caprolactone using a carboxylic acid compound (a) as an initiator.

<4> The surface-protective coating composition according to any one of <1> to <3>, wherein the polycaprolactone-based polymer (A) has a weight average molecular weight (Mw) of 1,500 or more and 50,000 or less.

<5> The surface-protective coating composition according to any one of <1> to <4>, wherein the zinc oxide (B) has a content of 0.5% by mass or more and 80% by mass or less in a solid content of the surface-protective coating composition.

<6> The surface-protective coating composition according to any one of <1> to <5>, wherein a solvent-soluble component of the surface-protective coating composition has an acid value of 10 mgKOH/g or more and 500 mgKOH/g or less.

<7> The surface-protective coating composition according to any one of <1> to <6>, which is an antifouling coating composition.

<8> A surface-protective coating film formed from the surface-protective coating composition according to any one of <1> to <7>.

<9> A substrate with a surface-protective coating film, which is coated with the surface-protective coating film according to <8>.

<10> The substrate with a surface-protective coating film according to <9>, wherein the substrate is a substrate in contact with water.

<11> A method of producing a substrate with a surface-protective coating film, including the following steps [1] and [2].

[1] applying the surface-protective coating composition according to any one of <1> to <7> to a substrate

[2] forming a coating film by drying the surface-protective coating composition applied to the substrate <12> A surface protection method using the surface-protective coating film according to <8>.

Advantageous Effects of Invention

According to the present invention, it is possible to provide a surface-protective coating composition capable of forming a surface-protective coating film in which the occurrence of cracks is suppressed while using a polymer having marine biodegradability.

Furthermore, according to the present invention, it is possible to provide a surface-protective coating film formed from the surface-protective coating composition; a substrate with a surface-protective coating film, which is coated with the surface-protective coating film, and a method of producing the same; and a surface protection method using the surface-protective coating film.

DESCRIPTION OF EMBODIMENTS

Hereinafter, the surface-protective coating composition, and the surface-protective coating film, the substrate with the surface-protective coating film and the production method thereof, and the surface protection method using the surface-protective coating composition according to the present invention will be described in detail.

In the following description, "(meth)acryloyl", "(meth) acrylate", "(meth)acrylic acid" and "(meth)acrylic" refer to "acryloyl and/or methacryloyl", "acrylate and/or methacrylate", "acrylic acid and/or methacrylic acid", and "acrylic and/or methacrylic", respectively.

[Surface-Protective Coating Composition]

The surface-protective coating composition according to the present invention (hereinafter also referred to as "the present composition" and "coating composition") contains a polycaprolactone-based polymer (A) (hereinafter also simply referred to as "polymer (A)") and a zinc oxide (B). The acid value of the polycaprolactone-based polymer (A) is 5 mgKOH/g or more and 200 mgKOH/g or less, and the content of a structural unit derived from caprolactone in the polycaprolactone-based polymer (A) is 50% by mass or more and 99.5% by mass or less.

According to the present invention, it is possible to provide a surface-protective coating composition capable of forming a surface-protective coating film in which the occurrence of cracks is suppressed while using the polymer (A) having marine biodegradability.

Although the detailed mechanism by which the above effects are obtained is not clear, it is partially considered as follows.

The polycaprolactone-based polymer (A), in which the content of structural units derived from caprolactone is 50% by mass or more and 99.5% by mass or less, has marine biodegradability. Conventionally, even if a polycaprolactone-based polymer is contained in a coating composition, there have been problems with coating film formability, such as cracks occurring when a coating film is formed.

In the present invention, the surface-protective coating composition contains a polymer (A) having a specific acid value and a zinc oxide (B) at the same time, whereby the acid groups of the polymer (A) and the zinc oxide (B) are thought to have had a weak interaction with each other. As a result, while maintaining fluidity as a coating material, in the case where the surface-protective coating composition is made into a coating film, it is considered that the interaction becomes stronger, and the polymer chain of the polymer takes a crosslinked structure, which increases the molecular weight, improves the physical properties of the coating film, and suppresses the occurrence of cracks.

The surface-protective coating composition of the present invention is a coating composition that is applied to the outermost surface of a substrate (article), and is not particularly limited as long as it is intended to protect the surface of the substrate. However, it is preferably used in applications where a coating film is preferred to be marine biodegradable.

Examples of a preferable embodiment include the use as a so-called antifouling coating composition that prevents aquatic organisms from adhering to ships, fishing materials, and the like that come into contact with or are immersed in the ocean.

Further, as another preferable embodiment, examples thereof include, without the purpose of antifouling from aquatic organisms, the use as a topcoat coating composition for marine structures such as outer sides and upper decks of ships, bridges, inner and outer walls of pipelines, tanks, and drilling plants and buoys, and structures such as seaport equipment where the coating film may flow into the ocean.

In addition, currently, various plastics that do not come into contact with or immerse in the ocean cause marine pollution, which is a problem from the perspective of environmental pollution. Therefore, even if the coating film is not necessarily provided on the outermost surface of an article, the coating film of which is expected to flow into the ocean, it is preferable from the viewpoint of environmental protection that the coating film has marine biodegradability. That is, the surface-protective coating composition of the present invention is expected to be applied to various coating compositions.

In the following description, an "antifouling coating composition" means a surface-protective coating composition intended for antifouling against aquatic organisms, and a "topcoat coating composition" means a surface-protective coating composition that is not directly intended for antifouling against aquatic organisms. In addition, the above-mentioned "topcoat coating composition" is applied to the uppermost layer of an article, and the object to which the topcoat coating composition is applied is not particularly limited as long as the topcoat coating composition is not intended for antifouling against adhesion of aquatic organisms. Also, it is not limited to a coating composition that is applied on an underlying coating film or an intermediate coating film, and examples thereof include an embodiment of applying directly to an object to be coated that does not require an undercoat layer, such as a plastic structure.

As described above, the surface-protective coating composition of the present invention can be applied to various uses. For example, the surface-protective coating composition is applicable to a coating composition that imparts design to the surface of an article, and a coating composition that imparts scratch resistance and damage resistance.

The present invention will be described in more detail below.

<Polycaprolactone-Based Polymer (A)>

The polycaprolactone-based polymer (A) (polymer (A)) is a polycaprolactone-based polymer and has an acid value of 5 mgKOH/g or more and 200 mgKOH/g or less.

The polymer (A) contains 50% by mass or more and 99.5% by mass or less of structural units derived from caprolactone, preferably ε-caprolactone, in the polymer. From the viewpoint of marine biodegradability, the content of the structural units is preferably 60% by mass or more, more preferably 75% by mass or more, and is preferably 97% by mass or less, more preferably 95% by mass or less.

When the ratio of structural units derived from caprolactone in the polymer (A) is within the above range, the marine biodegradability of the polymer (A) is good, the coating workability and storage stability of the coating composition containing the polymer (A) are excellent, and the physical properties of the coating film formed from the coating composition are improved.

The ratio of structural units derived from caprolactone in the polymer (A) may be determined based on the charged amount of raw materials used, or may be determined by analyzing the polymer composition by an analysis method such as NMR.

The acid value of the polymer (A) is 5 mgKOH/g or more and 200 mgKOH/g or less, preferably 10 mgKOH/g or more, more preferably 20 mgKOH/g or more, and is preferably 150 mgKOH/g or less, more preferably 100 mgKOH/g or less.

When the acid value of the polymer (A) is in such a range, the production workability, coating workability, storage stability, and film-forming properties of the coating composition containing the polymer (A) are favorable. In addition, physical properties such as antifouling property, crack generation suppressing property and strength of the formed coating film are good.

The acid value is defined as the amount (mg) of potassium hydroxide (KOH) required to neutralize 1 g of a target component, and is expressed in units of mgKOH/g. The acid value is a numerical value that is widely used to express the acid group content of a target, and can be obtained by measuring using a method based on JIS K 5601-2-1. Alternatively, the acid value may be calculated from the acid value of each component constituting the polymer and the ratio thereof.

The polymer (A) is preferably obtained by a polymerization reaction of ε-caprolactone using a carboxylic acid compound (a) as an initiator. By using the carboxylic acid compound (a) as an initiator, a polymer (A) having a terminal carboxy group can be obtained.

Examples of the carboxylic acid compound (a) include

- a monocarboxylic acid compound (a1) such as an acetic acid, a lactic acid, a benzoic acid, an abietic acid, a parastric acid, an isopimaric acid, a pimaric acid, a dehydroabietic acid, a neoabietic acid, and a tall oil fatty acid;
- a polyvalent carboxylic acid compound (a2) such as a succinic acid, an adipic acid, a malic acid, a tartaric acid, a citric acid, a 1,2,3-propanetricarboxylic acid, and a hexahydrotrimellitic acid;
- a (co)polymer (a3) obtained by polymerizing a monomer containing an acid group such as acrylic acid and methacrylic acid and an ethylenically unsaturated group; and
- a polyester polymer (a4) containing an acid group; and mixtures thereof may also be used.

When the monocarboxylic acid compound (a1) is used as the carboxylic acid compound (a), a polymer having excellent coating workability and storage stability of the coating composition can be obtained. Of these, when an abietic acid, a parastric acid, an isopimaric acid, a pimaric acid, a dehydroabietic acid, a neoabietic acid, and rosins containing these acids as main components are used, it is possible to obtain a polymer having excellent marine biodegradability and excellent coating workability and storage stability of the coating composition. Examples of rosins include rosins such as gum rosin, wood rosin, and tall oil rosin, hydrogenated rosin, disproportionated rosin, rosin derivatives such as rosin metal salts, and pine tar, and it is also preferable to use the rosins described above as the monocarboxylic acid compound (a1). In addition, it is also preferable to use benzoic acid as the monocarboxylic acid compound (a1), and benzoic acid is preferable in that a coating film having a high degree of whiteness can be easily obtained.

When the polyvalent carboxylic acid compound (a2) is used as the carboxylic acid compound (a), a polymer having excellent physical properties such as film-forming properties of the coating composition and strength of the coating film is obtained. Of these, one or more selected from the group consisting of a malic acid, a tartaric acid, and a citric acid is preferably used in that a polymer having good marine biodegradability can be obtained.

Further, a trivalent or higher-valent carboxylic acid compound is preferably used as the polyvalent carboxylic acid compound (a2) in that a polymer having particularly excellent film-forming properties at low temperatures of the coating composition can be obtained. Of these, the use of a hexahydrotrimellitic acid is more preferable in terms of obtaining a coating composition having even better coating workability.

The (co)polymer (a3) obtained by polymerizing a monomer containing an acid group and an ethylenically unsaturated group is preferably used as the carboxylic acid compound (a) in that a polymer having excellent physical properties such as the curability of the coating composition and the strength of the coating film can be obtained.

The (co)polymer (a3) obtained by polymerizing a monomer containing an acid group and an ethylenically unsaturated group may be a copolymer with a monomer other than the monomer containing an acid group and an ethylenically unsaturated group.

The amount of the carboxylic acid compound (a) used may be appropriately adjusted so as to obtain a desired acid value to be described later.

In the above reaction, a catalyst may be used as necessary, and examples of the catalyst include known compounds such as organotin compounds (dibutyltin dilaurate, dilauryltin oxide, etc.), metal alkoxides (titanium tetraisopropoxide, aluminum triisopropoxide, etc.), alkali metal compounds (lithium hydroxide, sodium hydroxide, etc.), acids and salts thereof (sulfuric acid, trifluoromethanesulfonic acid, p-toluenesulfonic acid, pentafluoroanilium triflate, etc.), antimony compounds, molybdenum compounds, and rare earth metal complexes, and the catalyst is not limited thereto.

Although the reaction temperature is not particularly limited, it is preferably room temperature to 200° C. or lower, more preferably room temperature to 170° C. or lower, and even more preferably 150° C. or lower.

Also, the reaction time is not particularly limited, and may be about 1 hour or more and 24 hours or less.

The polymer (A) may be obtained by copolymerizing a terminal unsaturated fatty acid hydroxyalkyl-modified polycaprolactone with an unsaturated carboxylic acid compound such as acrylic acid or methacrylic acid.

Examples of the terminal unsaturated fatty acid hydroxyalkyl-modified polycaprolactone include one-terminal (meth)acrylic acid hydroxyalkyl ester-modified polycaprolactone, and is specifically obtained by a polymerization reaction of ε-caprolactone using 2-hydroxyethyl (meth)acrylate as an initiator.

As the terminal unsaturated fatty acid hydroxyalkyl-modified polycaprolactone, a commercially available product may be used, and specific examples thereof include PLACCEL FA series (manufactured by Daicel Corporation).

The polymer (A) can be obtained by a further reaction of polycaprolactone, which is obtained by a polymerization reaction of ε-caprolactone using a compound having a hydroxy group among the carboxylic acid compounds (a) or a compound (b) having only a hydroxy group other than the above as an initiator, with an acid anhydride. Examples of the compound (b) include ethylene glycol and glycerin, and examples of the acid anhydride include a succinic anhydride and an adipic anhydride.

The weight average molecular weight (Mw) of the polymer (A) is preferably 1,500 or more, more preferably 2,000 or more, and still more preferably 2,500 or more, and is preferably 50,000 or less, more preferably 40,000 or less, and still more preferably 30,000 or less. When the weight average molecular weight of the polymer (A) is in such a range, the production workability, coating workability, and storage stability of a coating composition containing the polymer (A) are good, and furthermore, the coating composition can form a coating film having excellent physical properties, and thus is preferable.

In addition, from the same viewpoint, the number average molecular weight (Mn) of the polymer (A) is preferably 500 or more, more preferably 1,000 or more, and is preferably 30,000 or less, more preferably 25,000 or less, still more preferably 20,000 or less, and even more preferably 15,000 or less.

The weight average molecular weight (Mw) and number average molecular weight (Mn) of the polymer (A) refer to values of gel permeation chromatography (GPC) measured by methods described in the Examples.

In the polymer component contained in the present composition, the content of the polymer (A) is, from the viewpoint of improving the biodegradability of the coating film, preferably 50% by mass or more, more preferably 70% by mass or more, still more preferably 90% by mass or more, and even more preferably 95% by mass or more, and the upper limit thereof is not particularly limited and is 100% by mass or less.

The "polymer component" means a component having a weight average molecular weight of 1,000 or more and having a repeating unit.

The content of the polymer (A) in the solid content of the present composition is preferably 2% by mass or more, more preferably 5% by mass or more, and is preferably 90% by mass or less, more preferably 70% by mass or less, still more preferably 50% by mass or less, and even more preferably 30% by mass or less.

In addition, the content of the polymer (A) in the coating composition is preferably 1% by mass or more, more preferably 2% by mass or more, and is preferably 50% by mass or less, more preferably 30% by mass or less, and still more preferably 20% by mass or less.

When the content of the polymer (A) in the solid content of the coating composition or in the coating composition is within the above range, it is preferable in terms of excellent production workability, coating workability, and storage stability of the coating composition, and excellent physical properties of the formed coating film.

<Zinc Oxide (B)>

The present composition contains a zinc oxide (B).

The shape, average particle size, etc. of the zinc oxide (B) are not particularly limited, and the present composition may contain two or more types of zinc oxide having different shapes, average particle sizes, etc.

By containing the zinc oxide (B) in the present composition, it is possible to form a coating film that is excellent in physical properties such as film-forming properties and crack generation suppression property, as well as coating film gloss, coating film hardness, and durability. As described above, by forming a weak interaction between the zinc oxide (B) and the acid group of the polymer (A), while maintaining the fluidity of the coating material, it is considered that the interaction becomes stronger in the state of a coating film and excellent physical properties are obtained. In addition, when the present composition is applied to a substrate that is in contact with or immersed in the ocean, it is believed that zinc oxide moderately repels marine species that cause biodegradation and, in the state of a coating film, prevents rapid degradation of the polymer due to biodegradation. On the other hand, when coating film pieces are released into seawater due to mechanical damage or water flow, it is presumed that the coating film pieces gradually become finer due to water flow or hydrolysis, the separation of the polymer (A) and the zinc oxide (B) progresses, and as a result, the biodegradation progresses.

The average particle diameter (median diameter) of the zinc oxide (B) is, from the viewpoint of the dispersibility of the zinc oxide (B) in the present composition and from the viewpoint of improving the antifouling property of the resulting coating film, preferably 0.01 μm or more, more preferably 0.05 μm or more, still more preferably 0.1 μm or more, and particularly preferably 0.3 μm or more, and is preferably 10 μm or less, more preferably 5 μm or less, and still more preferably 2 μm or less.

In the description herein, the average particle diameter (median diameter) is a value measured by a laser diffraction scattering method using SALD-2200 (manufactured by Shimadzu Corporation).

The content of the zinc oxide (B) in the solid content of the present composition is preferably 0.5% by mass or more, more preferably 1.0% by mass or more, and even more preferably 1.5% by mass or more, and is preferably 80% by mass or less, more preferably 60% by mass or less, and even more preferably 40% by mass or less, from the viewpoint of the film-forming properties, the strength of the coating film, etc.

From the same viewpoint, the content of the zinc oxide (B) in the present composition is preferably 0.3% by mass or more, more preferably 0.5% by mass or more, and is preferably 60% by mass or less, more preferably 40% by mass or less, and still more preferably 30% by mass or less.

When the present composition is an antifouling coating composition, the content of the zinc oxide (B) in the solid content of the present composition is, from the viewpoint of film-forming properties, the strength of the coating film, etc., preferably 1% by mass or more, more preferably 2% by mass or more, and still more preferably 4% by mass or more, and is preferably 80% by mass or less, more preferably 60% by mass or less, and still more preferably 40% by mass or less.

Further, when the present composition is an antifouling coating composition, the content of the zinc oxide (B) in the present composition is, from the same viewpoint, preferably 0.5% by mass or more, more preferably 1% by mass, and still more preferably 3% by mass or more, and is preferably 60% by mass or less, more preferably 40% by mass or less, and still more preferably 30% by mass or less.

When the present composition is a topcoat coating composition that is not directly intended for antifouling against aquatic organisms, the content of the zinc oxide (B) in the solid content of the present composition is, from the viewpoint of the film-forming properties, the strength of the coating film, etc., preferably 0.5% by mass or more, more preferably 1.0% by mass or more, and still more preferably 1.5% by mass or more, and is preferably 60% by mass or less, more preferably 40% by mass or less, still more preferably 20% by mass or less, and even more preferably 15% by mass or less.

Further, when the present composition is a topcoat coating composition, the content of the zinc oxide (B) in the present composition is, from the same viewpoint, preferably 0.3% by mass or more, more preferably 0.5% by mass or more, and is preferably 40% by mass or less, more preferably 20% by mass or less, and even more preferably 10% by mass or less.

The content of the zinc oxide (B) with respect to 100 parts by mass of the polymer (A) is preferably 1 part by mass or more, more preferably 3 parts by mass or more, and still more preferably 5 parts by mass or more, and is preferably 1,000 parts by mass or less, more preferably 800 parts by mass or less, and even more preferably 500 parts by mass or less.

When the present composition is an antifouling coating composition, the content of the zinc oxide (B) with respect to 100 parts by mass of the polymer (A) is preferably 5 parts by mass or more, more preferably 10 parts by mass or more, still more preferably 20 parts by mass or more, and even more preferably 50 parts by mass or more, and is preferably 1,000 parts by mass or less, more preferably 800 parts by mass or less, and even more preferably 500 parts by mass or less.

When the present composition is a topcoat coating composition, the content of the zinc oxide (B) with respect to 100 parts by mass of the polymer (A) is preferably 1 part by mass or more, more preferably 3 parts by mass or more, and still more preferably 5 parts by mass or more, and is preferably 500 parts by mass or less, more preferably 200 parts by mass or less, and even more preferably 100 parts by mass or less.

<Other Optional Components>

The present composition may contain, as necessary, optional components other than the polymer (A) and the zinc oxide (B), such as a monocarboxylic acid compound (C), an organism repellent (D), other pigments (E), an antifoaming agent (F), a solvent (G), an anti-sagging agent/anti-settling agent (H), a plasticizer (I), and other polymers (J).

[Monocarboxylic Acid Compound (C)]

The present composition may contain a monocarboxylic acid compound (C) (hereinafter also referred to as compound (C)). When the present composition contains the compound (C), the production workability, coating workability, and storage stability of the coating composition are improved, and the appearance and crack generation suppressing property of the formed coating film can be improved.

When the present composition contains the compound (C), the compound (C) may be used alone or in combination of two or more kinds thereof.

The compound (C) is preferably a compound represented by, for example, R—COOH (R is a saturated or unsaturated aliphatic hydrocarbon group having 10 to 40 carbon atoms, a saturated or unsaturated alicyclic hydrocarbon group having 3 to 40 carbon atoms, or a hydrogen atom group having 3 to 40 carbon atoms in which a hydrogen atom of the saturated or unsaturated alicyclic hydrocarbon group is substituted by a saturated or unsaturated aliphatic hydrocarbon group) and a derivative thereof (for example, a metal ester).

Specifically, preferred examples of the compound (C) include an abietic acid, a neoabietic acid, a dehydroabietic acid, a parastric acid, an isopimaric acid, a pimaric acid, and rosins containing these acids as main components, a benzoic acid, a trimethylisobutenylcyclohexene carboxylic acid, a versatic acid, a stearic acid, and a naphthenic acid, and of these, the rosins are particularly preferred from the viewpoint that a coating film having excellent physical properties can be easily obtained.

Examples of the rosins include rosins such as gum rosin, wood rosin, and tall oil rosin; rosin derivatives such as hydrogenated rosin, disproportionated rosin, and rosin metal salts; and pine tar.

In addition, a benzoic acid is also preferable as the compound (C) from the viewpoint of being readily available and the ease of obtaining a coating film with a high degree of whiteness.

The compound (C) may be a metal ester of monocarboxylic acid. Examples of the metal ester include a zinc ester and a copper ester. When the present composition contains the metal ester, the metal ester may be used as a raw material in preparing the present composition, and the metal ester may be formed in the present composition or coating film.

Here, the "metal ester" is a salt formed by a metal and a carboxylic acid, and is preferably a compound produced by bonding a metal and a carboxylic acid. In addition, a compound having a divalent metal ester group represented by the following formula (1) is more preferable.

[Chem. 1]

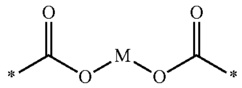

(1)

In the formula (1), M represents a metal, and * represents a bonding position.

Examples of the metal constituting the metal ester group include magnesium, calcium, neodymium, titanium, zirconium, iron, ruthenium, cobalt, nickel, copper, zinc, and aluminum. The metal constituting the metal ester group does not include metalloids. Examples of metalloids include boron, silicon, germanium, arsenic, antimony, and tellurium.

In the formula (1), M is a divalent metal, and the divalent metal can be appropriately selected and used from the metals described above. Of these, Group 10 to 12 metals such as nickel, copper, and zinc are preferred, copper and zinc are more preferred, and zinc is even more preferred.

In the formula (1), * represents a bonding position, indicating that it is connected to an arbitrary group, preferably an arbitrary organic group.

When the present composition contains the compound (C), the content thereof in the solid content of the present composition is, from the viewpoint that a coating composition with excellent coating workability can be easily obtained and a coating film with excellent water resistance can be easily obtained, preferably 0.1% by mass or more, more preferably 1% by mass or more, and still more preferably 5% by mass or more, and is preferably 50% by mass or less, and more preferably 35% by mass or less.

When the present composition contains the compound (C), the content of the zinc oxide (B) with respect to a total of 100 parts by mass of the polymer (A) and the compound (C) is preferably 1 part by mass or more, more preferably 2 parts by mass or more, and even more preferably 3 parts by mass or more, and is preferably 500 parts by mass or less, more preferably 300 parts by mass or less, and even more preferably 150 parts by mass or less.

[Organism Repellent (D)]

The composition may further contain an organism repellent (D) in order to improve the antifouling properties of the coating film formed from the present composition. In particular, when the present composition is an antifouling coating composition used for surface protection of a structure, the coating film of which comes into contact with or is immersed in the ocean, it preferably contains the organism repellent (D) in order to suppress adhesion of aquatic organisms.

When the present composition contains the organism repellent (D), the organism repellent (D) in the present composition may be used alone or in combination of two or more kinds thereof.

Examples of the organism repellent (D) include (+/−)-4-[1-(2,3-dimethylphenyl)ethyl]-1H-imidazole (also known as medetomidine), 4-bromo-2-(4-chlorophenyl)-5-(trifluoromethyl)-1H-pyrrole-3-carbonitrile (alias: tralopyryl), a metal pyrithione such as copper pyrithione and zinc pyrithione, 4,5-dichloro-2-n-octyl-4-isothiazolin-3-one (also known as DCOIT), a borane-nitrogen-based base adduct such as pyridine-triphenylborane and 4-isopropylpyridine(N-B)methyl (diphenyl)borane, cuprous oxide, copper oxide, copper (copper metal), and copper thiocyanate (also known as copper rhodanite), and of these, medetomidine, tralopyril, a metal pyrithione such as copper pyrithione and zinc pyrithione, and cuprous oxide are preferably contained.

When the present composition contains the organism repellent (D), the content of the organism repellent in the solid content of the present composition is, from the viewpoint of easily obtaining a coating film having sufficient antifouling property, etc., preferably 1% by mass or more, more preferably 5% by mass or more, and still more preferably 30% by mass or more, and is preferably 80% by mass or less, more preferably 70% by mass or less.

Two or more kinds of the organism repellent (D) may be used, and in this case, examples of suitable combinations include medetomidine and copper pyrithione, medetomidine and zinc pyrithione, medetomidine and cuprous oxide and copper pyrithione, cuprous oxide and copper pyrithione, and tralopyril and zinc pyrithione, from the viewpoint of easily obtaining an antifouling coating composition with excellent storage stability and easily obtaining a coating film having sufficient antifouling property and excellent water resistance, etc.

The medetomidine is a compound represented by the following formula (2).

Since the present composition contains the zinc oxide (B) as an essential component, when the present composition further contains medetomidine, due to the putative contribution from the interaction between zinc and medetomidine, a coating film having excellent barnacle resistance over a long period of time can be easily obtained.

[Chem. 2]

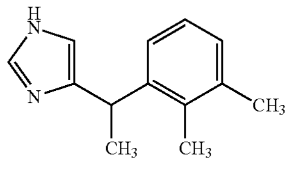

(2)

Medetomidine has optical isomerism; however, it may be one of them alone or a mixture in any ratio.

In addition, the present composition may use an imidazolium salt or an adduct to a metal or the like as part or all of medetomidine. In this case, an imidazolium salt or an adduct to a metal or the like may be used as a raw material for preparing the present composition, and the imidazolium salt or the adduct to a metal or the like may be formed in the present composition or coating film.

When the present composition contains medetomidine, the content of medetomidine in the solid content of the present composition is, from the viewpoint of easily obtaining a coating film having sufficient antifouling property, etc., preferably 0.02% by mass or more, more preferably 0.05% by mass or more, and is preferably 2% by mass or less, more preferably 1.0% by mass or less.

In addition, when the present composition contains tralopyril, the content of tralopyril in the solid content of the present composition is, from the viewpoint of easily obtaining a coating film having sufficient antifouling property, preferably 1% by mass or more, more preferably 2% by mass or more, and is preferably 10% by mass or less, more preferably 8% by mass or less.

As the metal pyrithione, copper pyrithione and zinc pyrithione are preferable, and copper pyrithione is preferable from the viewpoint of easily obtaining a coating film having excellent water resistance, crack generation suppressing property, and repairability, in particular, from the viewpoint of easily obtaining a coating film having long-term antifouling property while suppressing the degree of coating film consumption, etc.

When the present composition contains a metal pyrithione, the content of the metal pyrithione in the solid content of the present composition is, from the viewpoint of easily obtaining a coating film having sufficient antifouling property, etc., preferably 1% by mass or more, more preferably 2% by mass or more, and is preferably 30% by mass or less, more preferably 20% by mass or less.

The cuprous oxide is preferably particles having an average particle diameter (median diameter) of about 0.1 μm or more and 30 μm or less from the viewpoint that a coating film having long-term antifouling property can be easily obtained, etc., and those surface-treated with glycerin, a stearic acid, a lauric acid, a sucrose, a lecithin, a mineral oil, etc., are preferable from the viewpoint of easily obtaining an antifouling coating composition with excellent long-term stability during storage, etc.

Examples of commercially available products of the cuprous oxide include NC-301 (manufactured by NC Tech Co., Ltd.), NC-803 (manufactured by NC Tech Co., Ltd.), Red Copp 97N Premium (manufactured by American Chemet Co.), Purple Copp (manufactured by American Chemet Co.), and LoLo Tint 97 (manufactured by American Chemet Co.).

When the present composition contains a cuprous oxide, the content of the cuprous oxide in the solid content of the present composition is, from the viewpoint of easily obtaining a coating film having a moderate degree of coating film consumption and sufficient antifouling property, etc., preferably 10% by mass or more, more preferably 20% by mass or more, and is preferably 70% by mass or less, more preferably 60% by mass or less.

[Other Pigments (E)]

The present composition may contain, for example, for the purpose of coloring the coating film or concealing the substrate, or for the purpose of adjusting the coating film strength to an appropriate level, a pigment (E) other than the zinc oxide (B) and the organism repellent (D).

When the present composition contains other pigments (E), the other pigments (E) may be used alone or in combination of two or more kinds thereof.

Examples of the other pigments (E) include coloring pigments, such as titanium white (titanium oxide), colcothar (red iron oxide), yellow iron oxide, carbon black, naphthol red, and phthalocyanine blue; extender pigments, such as zinc phosphate, talc, mica, clay, potassium feldspar, calcium carbonate, kaolin, alumina white, white carbon, aluminum hydroxide, magnesium carbonate, barium carbonate, barium sulfate, calcium sulfate, and zinc sulfide; and functional pigments, such as conductive pigments, fluorescent pigments, aluminum pigments, and stainless steel pigments.

When the present composition contains other pigments (E), the total content of the other pigments (E) in the solid content of the present composition may be appropriately set depending on the opacity required for the coating film to be formed and the viscosity of the coating composition; however, it is preferably 1% by mass or more and 70% by mass or less.

When the surface-protective coating composition is an antifouling coating composition, the total content of the other pigments (E) in the solid content of the present composition is, from the viewpoint of the opacity required for the coating film to be formed and the viscosity of the coating material, preferably 1% by mass or more, more preferably 3% by mass or more, and still more preferably 5% by mass or more, and is preferably 70% by mass or less, more preferably 50% by mass or less, and still more preferably 40% by mass or less.

When the surface-protective coating composition is an antifouling coating composition, the other pigment (E) may contain talc from the viewpoint that a coating film excellent in crack generation suppressing property can be easily obtained, etc. When the present composition contains talc, the content thereof in the solid content of the present composition is preferably 1% by mass or more, more preferably 2% by mass or more, and is preferably 20% by mass or less, more preferably 10% by mass or less.

When the surface-protective coating composition is an antifouling coating composition, the other pigments (E) preferably include red iron oxide (colcothar) from the viewpoint of easily obtaining a coating film with excellent opacity and water resistance, etc. When the present composition contains red iron oxide, the content of the red iron oxide in the solid content of the present composition is preferably 0.5% by mass or more, more preferably 1% by mass or more, and even more preferably 2% by mass or more, and is preferably 20% by mass or less, more preferably 10% by mass or less, and even more preferably 5% by mass or less.

When the surface-protective coating composition is an antifouling coating composition, the other pigments (E) may contain barium sulfate from the viewpoint that a coating film having excellent antifouling property and weather resistance can be easily obtained, etc. When the present composition contains barium sulfate, the content of the barium sulfate in the solid content of the present composition is preferably 3% by mass or more, more preferably 5% by mass or more, and still more preferably 10% by mass or more, and is preferably 60% by mass or less, more preferably 40% by mass or less, and still more preferably 30% by mass or less.

When the surface-protective coating composition is a topcoat coating composition that is not directly intended for antifouling against aquatic organisms, the total content of the other pigments (E) in the solid content of the present composition is, from the viewpoint of the opacity required for the formed coating film and the viscosity of the coating material, preferably 1% by mass or more, more preferably 10% by mass or more, still more preferably 20% by mass or more, and even more preferably 40% by mass or more, and is preferably 70% by mass or less, and more preferably 60% by mass or less.

When the surface-protective coating composition is a topcoat coating composition that is not directly intended for antifouling against aquatic organisms, the other pigments (E) preferably contain a titanium oxide from the viewpoint of easily obtaining a coating film with excellent opacity and crack generation suppressing property, etc. When the present composition contains a titanium oxide, the content of the titanium oxide in the solid content of the present composition is preferably 1% by mass or more, more preferably 3% by mass or more, and still more preferably 10% by mass or more, and is preferably 60% by mass or less, more preferably 50% by mass or less, and still more preferably 40% by mass or less.

When the surface-protective coating composition is a topcoat coating composition that is not directly intended for antifouling against aquatic organisms, the other pigments (E) preferably contain barium sulfate from the viewpoint of improving the production workability and coating workability of the coating material and easily obtaining a coating film having excellent crack generation suppressing property, water resistance and coating film hardness, etc. When the present composition contains barium sulfate, the content of barium sulfate in the solid content of the present composition is preferably 1% by mass or more, more preferably 3% by mass or more, and still more preferably 10% by mass or more, and is preferably 60% by mass or less, more preferably 45% by mass or less, and still more preferably 30% by mass or less.

When the surface-protective coating composition is a topcoat coating composition or a road marking coating material that is not directly intended for antifouling against aquatic organisms, the other pigments (E) preferably contain calcium carbonate from the viewpoint of easily obtaining a coating film having excellent crack generation suppressing property and anti-sagging property, etc. When the present composition contains calcium carbonate, the content of calcium carbonate in the solid content of the present composition is preferably 0.5% by mass or more, more preferably 1% by mass or more, and still more preferably 2% by mass or more, and is preferably 30% by mass or less, more preferably 10% by mass or less, and still more preferably 5% by mass or less.

When the surface-protective coating composition is a road marking coating material, the other pigments (E) preferably contain calcium carbonate from the viewpoint of easily obtaining a coating film with excellent crack generation suppressing property, anti-sagging property, and strength, etc. When the present composition contains calcium carbonate, the content of the calcium carbonate in the solid content of the present composition is preferably 5% by mass or more, more preferably 10% by mass or more, and is preferably 70% by mass or less, more preferably 60% by mass or less.

[Antifoaming Agent (F)]

The present composition may contain an antifoaming agent (F). Examples of the antifoaming agent include an agent that has an effect of making the surface of the foam to be formed uneven and suppressing the formation of the foam, and an agent that has an effect of locally thinning the surface of the formed foam and breaking the foam. When the present composition contains an antifoaming agent, it is possible to suppress deterioration in the smoothness of the coating film due to foaming during the formation of the coating film.

When the present composition contains the antifoaming agent (F), the antifoaming agent (F) may be used alone or in combination of two or more kinds thereof.

Examples of the antifoaming agent (F) include a silicone-based antifoaming agent and a non-silicone-based antifoaming agent.

Examples of the silicone-based antifoaming agent include an antifoaming agent containing surface-active polysiloxane or a modified product thereof, and examples of the non-silicone-based antifoaming agent include an antifoaming agent other than the silicone-based antifoaming agent (an antifoaming agent that does not contain polysiloxane or a modified product thereof).

Examples of the silicone-based antifoaming agent include oil-type, compound-type, self-emulsifying-type, and emulsion-type antifoaming agents.

Examples of the non-silicone-based antifoaming agent include higher alcohol-based, higher alcohol derivative-based, fatty acid-based, fatty acid derivative-based, paraffin-based, polymer-based (for example, (meth)acrylic polymer-based), and mineral oil-based antifoaming agents.

From the viewpoint of the defoaming property of the surface-protective coating composition (in particular, defoaming property after the surface-protective coating composition is stored for a certain period of time), low friction resistance and appearance of the coating film and/or adhesion of the coating film to the substrate, etc., the antifoaming agent (F) preferably contains a silicone-based antifoaming agent, more preferably contains only a silicone-based antifoaming agent, even more preferably contains a fluorine-modified silicone-based antifoaming agent, and particularly preferably contains only a fluorine-modified silicone-based antifoaming agent.

The fluorine-modified silicone-based antifoaming agent is an antifoaming agent having a fluorine-modified polysiloxane structure.

A commercially available product may be used as the antifoaming agent (F).

Examples of the commercially available product of the fluorine-modified silicone-based antifoaming agent include fluorosilicone oil-based antifoaming agents such as BYK-066N (manufactured by BYK-Chemie Japan Co., Ltd) and FA-630 (manufactured by Shin-Etsu Chemical Co., Ltd.).

Examples of the commercially available product of the silicone-based antifoaming agent other than the fluorine-modified silicone-based antifoaming agent include silicone oil-based antifoaming agents such as KF-96 (manufactured by Shin-Etsu Chemical Co., Ltd.) and BYK-081 (manufactured by BYK Chemie Japan Co., Ltd.).

Examples of the commercially available product of the non-silicone-based antifoaming agent include a mineral oil-based antifoaming agent such as BYK-030 (manufactured by BYK Chemie Japan Co., Ltd.); a polymer-based antifoaming agent such as DISPARLON OX68 (manufactured by Kusumoto Chemicals, Ltd.), BYK-1790 (manufactured by BYK Chemie Japan Co., Ltd.), and DISPARLON OX-720 (manufactured by Kusumoto Chemicals, Ltd.).

When the present composition contains the antifoaming agent (F), the content thereof in the form of the antifoaming agent (F) is preferably 0.1 parts by mass or more, and more preferably 0.2 parts by mass or more, and is preferably 1 part by mass or less, and more preferably 0.6 parts by mass or less, based on 100 parts by mass of the content of the polymer (A).

In addition, for example, when b parts by mass of an antifoaming agent with a solid content of a % is used as the antifoaming agent (F) used when preparing the present composition based on 100 parts by mass of the polymer (A), the above "content in the form" of the antifoaming agent (F) is b parts by mass.

[Solvent (G)]

The present composition may contain, as necessary, a solvent (G) such as water and an organic solvent for the purpose of adjusting the viscosity of the composition, etc. In addition, for the present composition, a liquid containing the polymer (A) obtained when synthesizing the polymer (A) may be used as it is. In this case, examples of the solvent (G) include a solvent contained in the liquid, and a solvent added separately when mixing the polymer (A) and other optional components as necessary. The solvent (G) is preferably an organic solvent.

When the present composition contains the solvent (G), the solvent (G) may be used alone or in combination of two or more kinds thereof.

Examples of the organic solvent include an aromatic organic solvent such as xylene, toluene and ethylbenzene; a ketone such as methyl ethyl ketone, methyl isobutyl ketone and cyclohexanone; an aliphatic (having 1 to 10 carbon atoms, preferably about 2 to 5 carbon atoms) monohydric alcohol such as ethanol, isopropyl alcohol, n-butanol, isobutanol, and propylene glycol monomethyl ether; and an ester-based solvent such as ethyl acetate and butyl acetate. From the viewpoint of improving the production workability, coating workability, and storage stability of the coating composition, it preferably contains a monohydric alcohol and an aromatic organic solvent, and more preferably contains n-butanol, isobutanol, propylene glycol monomethyl ether, and xylene.

When the present composition contains the solvent (G), the content of the solvent (G) may be appropriately set so as to provide a desired viscosity according to the coating method of the antifouling coating composition; however, the content of the solvent (G) in the present composition is generally preferably about 0 to 50% by mass. When the content of the solvent (G) is too large, defects such as deterioration of anti-sagging property may occur.

[Anti-Sagging Agent/Anti-Settling Agent (H)]

The present composition may contain an anti-sagging agent/anti-settling agent (H) for the purpose of adjusting the viscosity of the composition, etc.

When the present composition contains the anti-sagging agent/anti-settling agent (H), the anti-sagging agent/anti-settling agent (H) may be used alone or in combination of two or more kinds thereof.

Examples of the anti-sagging agent/anti-settling agent (H) include an organic clay wax (for example, an Al, Ca, Zn stearate salt, a lecithin salt, and alkylsulfonate), an organic wax (for example, a polyethylene wax, an oxidized polyethylene wax, an amide wax, a polyamide wax, and a hydrogenated castor oil wax), a mixture of an organic clay wax and an organic wax, and a synthetic fine powdered silica.

As the anti-sagging agent/anti-settling agent (H), a commercially available product may be used, and examples of the commercial product include DISPARLON 305, DISPARLON 4200-20, DISPARLON A630-20X, and DISPARLON 6900-20X (all of which are manufactured by Kusumoto Chemical, Ltd.), A-S-A D-120 (manufactured by Itoh Oil Chemicals Co., Ltd.), CRAYTONE-MPZ (manufactured by BYK Chemie Japan Co., Ltd.), Bentone 27

(manufactured by Elementis Specialties Co., Ltd.), and "Aerosil No. 200" (manufactured by Nippon Aerosil Co., Ltd.).

When the present composition contains the anti-sagging agent/anti-settling agent (H), the content of the anti-sagging agent/anti-settling agent (H) in the solid content of the present composition is preferably 0.01% by mass or more, more preferably 0.1% by mass or more, and still more preferably 1% by mass or more, and is preferably 10% by mass or less, and more preferably 3% by mass or less.

[Plasticizer (I)]

The present composition may contain a plasticizer (I) for the purpose of imparting plasticity to the coating film, etc.

When the present composition contains the plasticizer (I), the plasticizer (I) may be used alone or in combination of two or more kinds thereof.

Examples of the plasticizer (I) include a phosphoric acid ester such as tricresyl phosphate (TCP); a phthalic acid ester such as dioctyl phthalate (DOP) and diisodecyl phthalate (DIDP); an adipic acid ester such as diisodecyl adipate and diisononyl adipate; diisononyl 1,2-cyclohexanedicarboxylate (Hexamoll (registered trademark) DINCH); a citric acid ester such as triethyl citrate, tributyl citrate, acetyl tributyl citrate, and acetyl tri(2-ethylhexyl) citrate; and a mixed dibasic acid ester such as DAIFATTY-101 (manufactured by Daihachi Chemical Industry Co., Ltd.). When the present composition contains such a plasticizer, it is possible not only to impart good plasticity to the coating film, but also to improve the storage stability of the coating composition.

When the present composition contains the plasticizer (I), the content of the plasticizer (I) in the solid content of the present composition is, from the viewpoint of being able to maintain good plasticity of the coating film, etc., preferably 0.1% by mass or more, more preferably 0.5% by mass or more, and still more preferably 1.0% by mass or more, and is preferably 10% by mass or less, more preferably 5% by mass or less, and still more preferably 3% by mass or less.

[Other Polymers (J)]

The present composition may contain a polymer (J) other than the polymer (A) for the purpose of imparting water resistance, crack generation suppressing property, and strength to the formed coating film, etc.

When the present composition contains the other polymer (J), the other polymer (J) may be used alone or in combination of two or more kinds thereof.

Examples of the other polymers (J) include, for example, a polycaprolactone-based polymer other than the polymer (A) (for example, a polycaprolactone-based polymer having an acid value of less than 5 mgKOH/g), a polyester-based polymer, a (meth)acrylic (co)polymer (a (meth)acrylic resin), a vinyl-based (co)polymer (including polyvinyl ethyl ether, etc.), a chlorinated paraffin, n-paraffin, a terpene phenol resin, a petroleum resin, and a ketone resin.

When the present composition contains the other polymer (J), the content of the other polymer (J) is preferably 0.1% by mass or more and 40% by mass or less in the solid content of the present composition.

<Method of Preparing Present Composition>

The present composition can be prepared using the same apparatus, method, and the like as used in preparing a known general coating composition.

Specifically, the present composition can be prepared by, after synthesizing the polymer (A), adding the obtained polymer (A) or a solution containing the polymer (A), the zinc oxide (B), and if necessary, other optional components to a container at once or sequentially and stirring and mixing. In this case, it is preferable to bring the polymer (A) into contact with the zinc oxide (B) first.

<Physical Properties of Present Composition (Acid Value of Solvent-Soluble Component)>

The acid value of the solvent-soluble component of the present composition is preferably 10 mgKOH/g or more, more preferably 20 mgKOH/g or more, and is preferably 500 mgKOH/g or less, more preferably 300 mgKOH/g or less, from the viewpoint of obtaining curability and good physical properties of the coating film, etc.

The "acid value of the solvent-soluble component" in the present invention refers to the acid value of a component (mixture) that is soluble in a specific solvent to be described later among the solid contents excluding volatile components in the coating composition. The component soluble in the solvent is considered to be mainly a component that forms a continuous phase of the coating film, such as a polymer and a resin acid (rosin, versatic acid, etc.). Since the acid value of the solvent-soluble component is an average value of the acid values of these components, the acid value indicates the overall acid concentration of the continuous phase of the coating film, and it is considered that the aforementioned excellent effects can be obtained when the acid value is in the above range.

The acid value of the solvent-soluble component can be measured by a method based on JIS K 5601-2-1:1999 for the solvent-soluble component obtained by extracting the present composition with a solvent. As the solvent used for extraction, a mixed solution of xylene/ethanol (xylene/ethanol=70/30 (mass ratio), all mixed solutions below have the mass ratio) is generally used from the viewpoint of dissolving components such as a resin forming the continuous phase of the present composition.

Specifically, the acid value of the solvent-soluble component can be measured by, for example, a method including the following procedures (1) to (6).

(1) Placing the weighed present composition after removal of the solvent, and a xylene/ethanol mixed solution having a mass about 10 times that of the present composition in a centrifuge tube and thoroughly mixing.

(2) After centrifuging at 0° C. and 3,500 rpm for 30 minutes, removing the supernatant and transferring the supernatant to another container.

(3) Adding the same amount of a xylene/ethanol mixed solution as in (1) to the extraction residue again and mixing, centrifuging under the same conditions as in (2), removing the supernatant and transferring the supernatant to the container containing the first supernatant. Repeating the operation one more time.

(4) Using the sum of the supernatants obtained by the three times of centrifugation as an extract, and measuring the mass ratio (%) of the solid content of the extract. Calculating the mass ratio (%) of the solid content by weighting a part of the extract, drying the weighed extract in a hot air dryer at 108° C. for 3 hours, measuring the mass of the remaining solid content, and calculating the mass ratio of the solid content in the weighed extract.

(5) Placing about 5 g of the extract in a beaker, measuring the mass of the extract, and calculating the mass of the sample solvent-soluble component in the extract using the value of the mass ratio (%) of the solid content obtained in (4) above, and defining the calculated value as x (g). Diluting the extract with ethanol to a total volume of 50 mL.

(6) Performing potentiometric titration at 20° C. on the ethanol-diluted solution of the extract prepared in (5) above and 50 mL of ethanol as a blank by using 0.1 mol/L potassium hydroxide solution (alcoholic) (N/10) (manufactured by Kanto Chemical Co., Inc.) and calculating the acid value AV from the following formula.

$$AV=\{(V_X-V_0)\times f\times 5.61\}/x$$

x: Mass of the sample (g)

$V_X$: Titration value for ethanol-diluted solution (mL)

$V_0$: Titration value for blank (mL)

f: Factor of 0.1 mol/L potassium hydroxide solution used for titration

A Hiranuma automatic titrator COM-1750 (manufactured by Hiranuma Co., Ltd.) is used for potentiometric titration.

In addition, extraction of the solvent-soluble component and acid value thereof can be measured by the same method not only from the coating composition, but also from the formed coating film.

<<Coating Film, Substrate with Coating Film and Method of Producing the Same, and Antifouling Method for Substrate (Surface Protection Method)>>

The coating film according to the present invention (hereinafter also referred to as "the present coating film") is formed from the present composition, and can usually be obtained by drying the present composition. The present coating film is usually formed on a substrate and used as a substrate with the present coating film having the substrate and the present coating film.

A suitable example of the method of producing the substrate with the present coating film includes a method of applying the present composition to at least a part of a substrate and then drying the present composition. That is, in the present invention, it is preferable that the method of producing a substrate with the present coating film is a production method including the following steps [1] and [2].

[1] Applying the surface-protective coating composition of the present invention to a substrate

[2] Forming a coating film by drying the surface-protective coating composition applied to the substrate In addition, the surface protection method of the substrate according to the present invention includes a step of forming the present coating film on at least a part of the substrate. Since the method of producing the substrate with the present coating film includes the step of forming the present coating film on at least a part of the substrate, the production method can also be said to be a surface protection method of the substrate.

The substrate is not particularly limited; however, the present composition is a surface substrate of a structure that may cause part of the substrate or the coating film to flow out into the ocean, and examples thereof include a ship (an outside shell of a ship's hull of a large scale steel-hulled ship, such as a container ship and a tanker, a fishing boat, an FRP boat, a wooden vessel, and a yacht; including a newly built ship and a repaired ship), a fishing material (such as a rope, a fishing net, a fishing gear, a float, and a buoy), a petroleum pipeline, a water conduit, a water circulation pipe, a diver suit, a swimming goggle, an oxygen cylinder, a swim suit, a torpedo, a structure such as a feed-water and drainage port for a thermal power or nuclear power plant, a marine cable, a seawater utilization equipment (such as a seawater pump), a mega-float, a coastal road, an undersea tunnel, seaport equipment, underwater structures such as structures for various underwater civil engineering works in a canal, a water channel, or the like, outer sides and upper decks, tanks, inner surfaces of holds of ships, bridges, and roads. Of these, the coating composition of the present invention is preferably used for protecting the substrates that are in contact with or face water, since there is a high possibility that a portion of the substrate or the coating film will flow out into the ocean.

The substrate may be a substrate treated with other treatment agents such as a rust inhibitor, or a substrate having a coating film such as a primer formed on the surface thereof, and coating may also be applied to the untreated substrate as it is. Furthermore, the substrate may be a substrate on which the present coating film is formed or a substrate on which the present coating film that has deteriorated over time is formed. There are no particular restrictions on the type of object that the present coating film comes into direct contact with.

Examples of the materials of the substrate include metal, concrete, asphalt, resin materials, fiber-reinforced resin materials, wood materials, and paper. Specific examples of the metal include steels such as carbon steel and stainless steel, aluminum, copper, copper alloys, and zinc. The shape of the substrate is not particularly limited and may be a plate, a tube, a half tube, a sphere, or the like.

The method of providing the present composition on at least a part of the substrate is not particularly limited, and examples thereof include a method of applying the present composition to the substrate, and a method of immersing the substrate in the present composition (impregnating a substrate with the present composition).

Examples of the coating method include known methods such as methods using a brush, a roller, and a spray.

Examples of the drying method include a method of allowing to stand at room temperature (for example, 25° C.) for preferably about 0.5 to 14 days, more preferably about 1 to 7 days. The drying may be performed under heating or while blowing air.

The thickness of the present coating film after drying may be arbitrarily selected according to the degree of coating film consumption of the present coating film, the use of the present coating film, the period of time, etc.; however, for example, the thickness is preferably 30 μm or more and 1,000 μm or less. Examples of the method of producing a coating film of the thickness include a method of applying the present composition once or multiple times such that a dry film preferably having a thickness of 10 μm or more and 300 μm or less, more preferably 20 μm or more and 200 μm or less is obtained per application.

Further, the substrate with the present coating film may be produced by a method including a step (I') of forming the present coating film and a step (II') of attaching the obtained present coating film to a substrate.

The step (I') is not particularly limited, and examples thereof include a method of using a release-treated support as necessary instead of the substrate in the method of providing the present composition on at least a part of the substrate.

The step (II') is also not particularly limited, and examples thereof include the method described in JP 2013-129724 A.

Also, the coating film of the present invention may be used for display. Examples of such displays include draft marks for measuring the draft height of ships, and various road markings indicating information such as rules and instructions regarding road traffic.

EXAMPLES

Hereinafter, the present invention will be described more specifically with reference to Examples; however, the present invention is not limited by these Examples. In the following description, "parts" means "parts by mass" unless otherwise contrary to the spirit.

In addition, the "solid content" of each component or the present composition in the description herein refers to components excluding a volatile component contained as a solvent in each component or the present composition, and has the same meaning as that obtained by drying each component or the present composition in a hot air dryer at 108° C. for 3 hours.

Production Example 1; Production of Polycaprolactone-Based Polymer Solution (A-1)

In a reaction vessel equipped with a stirrer, a reflux condenser, a thermometer, and a nitrogen introducing tube, 99.0 parts by mass of 8-caprolactone and 1.0 part by mass of citric acid were charged and were heated till the liquid temperature reached 100° C. while stirring under a nitrogen atmosphere. After confirming that the citric acid had dissolved, 0.05 parts by mass of pentafluoroanilium triflate were added to the liquid. Thereafter, the liquid temperature was raised to 120° C., and after keeping the same temperature for 6 hours, 100 parts by mass of xylene were added to obtain a yellow transparent polymer solution (A-1). The raw materials used and the characteristic values of the polymer solution (A-1) are shown in Table 1.

Production Examples 2 to 22: Production of Polycaprolactone-Based Polymer Solutions (A-2) to (A-20) and (J-1) to (J-2)

Polymer solutions (A-2) to (A-20) and (J-1) to (J-2) were prepared in the same manner as in Production Example 1, except that the raw materials used in Production Example 1 were replaced with the types and amounts of raw materials shown in Table 1, and the reaction temperature and time were appropriately adjusted. The raw materials used, the acid values of the polymers calculated based on the acid value of each raw material, and the characteristic values of the polymer solutions (A-2) to (A-20) and (J-1) to (J-2) are shown in Table 1.

TABLE 1-1

| | | | Production Examples | | | | | |
|---|---|---|---|---|---|---|---|---|
| | | | 1 (A-1) | 2 (A-2) | 3 (A-3) | 4 (A-4) | 5 (A-5) | 6 (A-6) |
| Raw materials used (parts by mass) | (a) | Citric acid | 1.0 | 3.0 | 5.0 | 10.0 | 20.0 | |
| | | 1,2,3-propanetricarboxylic acid | | | | | | 5.0 |
| | | Hexahydro trimellitic anhydride | | | | | | |
| | | Malic acid | | | | | | |
| | | Tartaric acid | | | | | | |
| | | Adipic acid | | | | | | |
| | | Rosin | | | | | | |
| | | Hartall FA-1* | | | | | | |
| | | Benzoic acid | | | | | | |
| | Glycerin | | | | | | | |
| | ε-caprolactone | | 99.0 | 97.0 | 95.0 | 90.0 | 80.0 | 95.0 |
| Total | | | 100.0 | 100.0 | 100.0 | 100.0 | 100.0 | 100.0 |
| Calculated value | Acid value (mgKOH/g) | | 8.8 | 26.3 | 43.8 | 87.7 | 175.3 | 47.8 |
| Characteristic value | Solid content (% by mass) | | 49.6 | 49.7 | 49.8 | 50.9 | 50.9 | 49.1 |
| | Viscosity (mPa · s, 25° C.) | | 299 | 147 | 98 | 68 | 65 | 50 |
| | Weight average molecular weight (Mw) | | 14,846 | 10,210 | 7,595 | 4,789 | 2,507 | 5,043 |
| | | | **Production Examples** | | | | | |
| | | | **7 (A-7)** | **8 (A-8)** | **9 (A-9)** | **10 (A-10)** | **11 (A-11)** | **12 (A-12)** |
| Raw materials used (parts by mass) | (a) | Citric acid | | | | | | |
| | | 1,2,3-propanetricarboxylic acid | 10.0 | | | | | |
| | | Hexahydro trimellitic anhydride | | 6.0 | 12.0 | 24.0 | | |
| | | Malic acid | | | | | 5.0 | 10.0 |
| | | Tartaric acid | | | | | | |
| | | Adipic acid | | | | | | |
| | | Rosin | | | | | | |
| | | Hartall | | | | | | |

TABLE 1-1-continued

| | | | | | | | |
|---|---|---|---|---|---|---|---|
| | FA-1* | | | | | | |
| | Benzoic acid | | | | | | |
| | Glycerin | | | | | | |
| | ε-caprolactone | 90.0 | 94.0 | 88.0 | 76.0 | 95.0 | 90.0 |
| Total | | 100.0 | 100.0 | 100.0 | 100.0 | 100.0 | 100.0 |
| Calculated value | Acid value (mgKOH/g) | 95.6 | 47.4 | 94.8 | 189.6 | 41.9 | 83.7 |
| Characteristic value | Solid content (% by mass) | 48.5 | 50.3 | 50.0 | 49.7 | 49.6 | 50.3 |
| | Viscosity (mPa · s, 25° C.) | <50 | 57 | <50 | 59 | 94 | 61 |
| | Weight average molecular weight (Mw) | 2,999 | 5,235 | 3,541 | 3,499 | 7,997 | 5,059 |

*Hartall FA-1: Tall oil fatty acid, manufactured by Harima Chemicals, Inc., acid value: 194 mgKOH/g, iodine value: 132 $gI_2$/100 g

TABLE 1-2

| | | | Production Examples | | | | | | | | | |
|---|---|---|---|---|---|---|---|---|---|---|---|---|
| | | | 13 (A-13) | 14 (A-14) | 15 (A-15) | 16 (A-16) | 17 (A-17) | 18 (A-18) | 19 (A-19) | 20 (A-20) | 21 (J-1) | 22 (J-2) |
| Raw materials used (parts by mass) | (a) | Citric acid | | | | | | | | | | |
| | | 1,2,3-propanetricarboxylic acid | | | | | | | | | 25.0 | z |
| | | Hexahydrotrimellitic acid | | | | | | | | | | |
| | | Malic acid | | | | | | | | | | |
| | | Tartaric acid | 5.0 | 10.0 | | | | | | | | |
| | | Adipic acid | | | 5.0 | 10.0 | | | | | | |
| | | Rosin | | | | | 10.0 | 20.0 | | | | |
| | | Hartall FA-1* | | | | | | | 18.0 | | | |
| | | Benzoic acid | | | | | | | | 9.0 | | |
| | Glycerin | | | | | | | | | | | 10.0 |
| | ε-caprolactone | | 95.0 | 90.0 | 95.0 | 90.0 | 90.0 | 80.0 | 82.0 | 91.0 | 75.0 | 90.0 |
| Total | | | 100.0 | 100.0 | 100.0 | 100.0 | 100.0 | 100.0 | 100.0 | 100.0 | 100.0 | 100.0 |
| Calculated value | Acid value (mgKOH/g) | | 37.4 | 74.8 | 38.4 | 76.8 | 18.6 | 37.2 | 35.9 | 41.4 | 238.9 | 0.0 |
| Characteristic value | Solid content (% by mass) | | 49.5 | 49.5 | 49.1 | 48.2 | 57.0 | 57.6 | 49.0 | 33.4 | 49.7 | 47.6 |
| | Viscosity (mPa · s, 25° C.) | | 133 | 80 | <50 | <50 | 73 | 64 | <50 | <50 | 59 | <50 |
| | Weight average molecular weight (Mw) | | 11,087 | 6,341 | 5,039 | 2,742 | 4,998 | 3,916 | 3,901 | — | 1,491 | 3,071 |

*Hartall FA-1: Tall oil fatty acid, manufactured by Harima Chemicals, Inc., acid value: 194 mgKOH/g, iodine value: 132 $gI_2$/100 g

Production Example 23: Production of Polycaprolactone-Based Polymer Solution (A-21)

In a reaction vessel equipped with a stirrer, a reflux condenser, a thermometer, a dropping funnel, and a nitrogen introducing tube, 70.0 parts by mass of ε-caprolactone were charged and were heated till the liquid temperature reached 90° C. while stirring under a nitrogen atmosphere. While keeping the liquid temperature at 90° C., a mixture composed of 20.0 parts by mass of ε-caprolactone, 10.0 parts by mass of an acrylic acid, 4.0 parts by mass of 2,2'-azobis(2-methylbutyronitrile), and 1.0 part by mass of t-butyl peroxyoctoate was added dropwise into the reaction vessel over 1 hour using the dropping funnel. After the liquid temperature was maintained at 90° C. for 1 hour from the completion of the dropwise addition, the temperature was gradually raised, and the mixture was heated and stirred at a liquid temperature of 100° C. for 1 hour and then at 110° C. for 1 hour. Thereafter, 0.05 parts by mass of pentafluoroanilium triflate were added to the liquid, the liquid temperature was raised to 160° C., and after heating and stirring at the same temperature for 6 hours, 100 parts by mass of xylene were added to obtain a yellow transparent polymer solution (A-21). The raw materials used and the characteristic values of the polymer solution (A-21) are shown in Table 2.

Production Example 24: Production of Polycaprolactone-Based Polymer Solution (A-22)

In a reaction vessel equipped with a stirrer, a reflux condenser, a thermometer, a dropping funnel, and a nitrogen introducing tube, 46.2 parts by mass of xylene were charged and were heated till the liquid temperature reached 100° C. while stirring under a nitrogen atmosphere. A mixture composed of 135.7 parts by mass of Praxel FA-10L, 5.0 parts by mass of an acrylic acid, 13.1 parts by mass of xylene, 1.0 part by mass of 2,2'-azobis-2-methylbutyronitrile, and 1.0 part by mass of t-butyl peroxyoctoate was added dropwise into the reaction vessel over 2 hour using the dropping funnel. While keeping the same temperature, parts by mass of t-butyl peroxyoctoate was respectively added 1 hour, 1.5 hours, and 2 hours after the completion of the dropwise addition, and the mixture was heated and stirred for 3 hours to obtain a polymer solution (A-22). The raw materials used and the characteristic values of the polymer solution (A-22) are shown in Table 2.

Production Example 25: Production of Polycaprolactone-Based Polymer Solution (J-3)

In a reaction vessel equipped with a stirrer, a reflux condenser, a thermometer, a dropping funnel, and a nitrogen introducing tube, 46.2 parts by mass of xylene were charged and were heated till the liquid temperature reached 100° C. while stirring under a nitrogen atmosphere. A mixture composed of 142.9 parts by mass of Praxel FA-10L, 11.0 parts by mass of xylene, and 1.0 part by mass of t-butyl peroxyoctoate was added dropwise into the reaction vessel over 2 hour using the dropping funnel. While keeping the same temperature, 0.1 parts by mass of t-butyl peroxyoctoate was respectively added 1 hour, 1.5 hours, and 2 hours after the completion of the dropwise addition, and the mixture was heated and stirred for 3 hours to obtain a polymer solution (J-3). The raw materials used and the characteristic values of the polymer solution (J-3) are shown in Table 2.

TABLE 2

| | | Production Examples | | |
|---|---|---|---|---|
| | | 23 (A-21) | 24 (A-22) | 25 (J-3) |
| Raw materials used (parts by mass) | (a) Acrylic acid | 10.0 | 5.0 | |
| | ε-caprolactone | 90.0 | | |
| | Praxel FA-10L* | | 135.7 | 142.9 |
| | Total | 100.0 | 140.7 | 142.9 |
| Calculated value | Acid value (mgKOH/g) | 80.2 | 39.0 | 0.0 |
| Characteristic value | Solid content (% by mass) | 49.2 | 51.0 | 49.9 |
| | Viscosity (mPa · s, 25° C.) | 437 | 124 | 67 |
| | Weight average molecular weight (Mw) | 27,925 | 25,245 | 22,436 |

*A toluene solution of single-end unsaturated fatty acid hydroxyalkyl ester-modified poly ε-caprolactone (hydroxy group-terminated) (non-volatile content: 70%)
$CH_2{=}CHCOO(CH_2)_2O[CO(CH_2)_5O]_nH$
n = 10

<Viscosity of Polymer Solution>

The viscosity of the polymer solution at 25° C. was measured with an E-type viscometer (VISCOMETER TV-25: manufactured by Toki Sangyo Co., Ltd.).

<Measurement of Number Average Molecular Weight (Mn) and Weight Average Molecular Weight (Mw) of Polymer>

The number average molecular weight (Mn) and the weight average molecular weight (Mw) of the polymer were measured using GPC (gel permeation chromatography) under the following condition.

GPC Condition

Equipment: "HLC-8320GPC" (manufactured by Tosoh Corporation)

Columns: "TSK gel guard column SuperMPHZ-M" (manufactured by Tosoh Corporation)×1+"TSK gel Super MultiporeHZ-M" (manufactured by Tosoh Corporation)×2

Eluent: Tetrahydrofuran (THF)

Flow rate: 0.35 mL/min

Detector: RI

Column thermostat chamber temperature: 40° C.

Standard substance: Polystyrene

Preparation method of sample: After adding an eluent to the polymer solutions prepared in each production example, the filtrate obtained by filtering through a membrane filter was designated as a sample for the GPC measurement.

<Marine Biodegradability of Polymer>

"Oxitop (registered trademark) 6" (manufactured by WTW of Xylem Analytics Germany Sales GmbH & Co. KG.), which is an apparatus that measures BOD (Biochemical Oxygen Demand) by calculating back from the pressure reduced by absorbing carbon dioxide generated by biodegradation of the polymer into sodium hydroxide, was used to evaluate the marine biodegradability of the polymers. Using the apparatus, 164 mL of seawater from Hiroshima Bay was added to 32 mg of the solid content of each of the aforementioned polymers, the BOD for 150 hours at 23° C. was measured and the BOD value for seawater alone tested at the same time was subtracted, and the ratio to a theoretical BOD calculated from the amount of added polymer was used as the evaluation value of the marine biodegradability. The solid content of the polymer is obtained by removing the organic solvent by drying each polymer solution at room temperature for one week, for example.

As a result of the evaluation of the marine biodegradability of the solid contents of the polymers obtained by drying the polymer solutions (A-8), (A-10), and (A-14), the marine biodegradability thereof was 96%, 85%, and 83%, respectively, and all of the evaluation values were 70% or more, determining that the polymer solutions have good marine biodegradability.

<Production of Coating Composition and Coating Film>

Blending Components

Each blending component used in the coating composition is shown in Table 3.

TABLE 3

| Components | | | Chemical formula, characteristics, and manufacturer, etc. |
|---|---|---|---|
| (B) | | Zinc oxide | "Zinc Oxide Grade 2", manufactured by Hakusui Tech Co, Ltd. Average particle diameter: 0.7 to 1.1 μm |
| (C) | Monocarboxylic acid compound | Rosin | WW Rosin (made in China) |
| | | Benzoic acid | — |
| (D) | Organism repellent | Copper pyrithione | "Copper Omadine Powder", manufactured by Arch UK Biocides Ltd. Chemical formula: $Cu(—S—C_5H_4N—O—)_2$ |
| | | Cuprous oxide | "Red Copp 97N Premium" Manufactured by American Chemet Corporation |
| | | Zinc pyrithione | "CleanBio-ZP", manufactured by Kolon Life Science, Inc Chemical formula: $Zn(—S—C_5H_4N—O—)_2$ |
| | | DCOIT | Chemical formula: 4,5-dichloro-2-n-octyl-4-isothiazolin-3-one |
| | | Tralopyril | "ECONEATM TECNICAL" Manufactured by JANSSEN Sourcing Singapore |

TABLE 3-continued

| Components | | Chemical formula, characteristics, and manufacturer, etc. |
|---|---|---|
| | Medetomidine | "Selektope", manufactured by I-tech AB<br>Chemical name: (±)-4-[1-(2,3-dimethylphenyl)ethyl]-1H-imidazole |
| (E) Other pigments | Red iron oxide | "Bengara No. 404"<br>Manufactured by Morishita Bengara Kogyo Co., Ltd. |
| | Organic red pigment | "Novoperm Red F5RK", manufactured by Clariant Japan K.K. |
| | Titanium oxide | "Tipaque PFC105", manufactured by Ishihara Sangyo Kaisha, Ltd. |
| | Barium sulfate | "Precipitated Barium Sulfate 100", manufactured by Sakai Chemical Industry Co., Ltd. |
| | Calcium carbonate | "Super SS", manufactured by Maruo Calcium Co., Ltd. |
| | Talc | "TTK Talc", manufactured by Takehara Kagaku Kogyo Co., Ltd. |
| (G) Solvent | Xylene | — |
| | PGM | Propylene glycol monomethyl ether |
| | n-butanol | — |
| (H) Anti-sagging agent/anti-settling agent | Organic modified bentonite | Quaternary ammonium compound of bentonite<br>Manufactured by BYK, "TIXOGEL MPZ" |
| | Organic hectorite clay | "Bentone 27", organic hectorite clay, manufactured by Elementis Specialties Co., Ltd. |
| | Fumed silica | "Aerosil No. 200", manufactured by Nippon Aerosil Co., Ltd. |
| (I) Plasticizer | TCP | "TCP-A", manufactured by Daihachi Chemical Industry Co., Ltd.<br>Chemical name: tricresyl phosphate |
| | Mixed dibasic acid ester | "Daifatty-101", manufactured by Daihachi Chemical Industry Co., Ltd. |
| | ATEHC | "CITROFOL (registered trademark) AHII", manufactured by Jungbunzlauer<br>Chemical name: acetyltri-2-ethylhexyl citrate |

Examples 1 to 60 and Comparative Examples 1 to 9

Coating compositions were prepared by mixing and stirring each component in the amounts (parts by mass) shown in Tables 4 to 7.

The coating compositions shown in Tables 4 and 5 are intended to be antifouling coating compositions intended for antifouling against aquatic organisms, the coating compositions shown in Table 6 are intended for topcoat coating compositions not intended for antifouling against aquatic organisms, and the coating compositions shown in Table 7 are intended for road marking coating compositions.

In addition, Tables 4 to 7 show the acid values of the solvent-soluble components of each coating composition.

[Evaluation]

The following evaluations were performed on the obtained coating compositions.

<Coating Film Appearance Test>

To a calcium silicate panel (thickness: 5 mm), the surface-protective coating compositions obtained in the above Examples and Comparative Examples were applied such that the thickness of the dry film thereof was about 300 μm, and were then dried at 25° C. for one day to fabricate a test panel for coating film appearance evaluation. The coating film surface of the test panel was observed and evaluated according to the following [Evaluation Criteria for Coating Film Appearance]. The results are shown in Tables 4 to 7.

[Evaluation Criteria for Coating Film Appearance]

3: There is no crack on the coating film surface

2: There is a crack with a length of less than 10 mm on the coating film surface 1: There is a crack with a length of 10 mm or more on the coating film surface <Damage Resistance Test>

To a sand-blasted steel panel (length 150 mm×width 70 mm×thickness 1.6 mm), an epoxy-based antirust paint (epoxy AC paint, trade name "Bannoh 1500", manufactured by Chugoku Marine Paints, Ltd.) was applied such that the thickness of the dry film thereof was about 100 μm. After drying for one day, an epoxy-based intermediate coating (trade name "Bannoh 1500R Z", manufactured by Chugoku Marine Paints, Ltd.) was applied thereon such that the thickness of the dry film thereof was about 100 μm, and was then dried for one day. Furthermore, the surface-protective coating compositions obtained in Examples 1 to 39 and Comparative Examples 1 to 4 were applied thereon such that the thickness of the dry film thereof was about 400 μm, and was then dried at 25° C. for 7 days to fabricate a damage resistance test panel.

After dropping a weight of 500 g from a drop height of 40 cm onto the damage resistance test panel fabricated as described above according to 6. Dupont formula of JIS K 5600-5-3:1999, damage to the coating film was observed and evaluated according to the following [Evaluation Criteria for Damage Resistance]. The results are shown in Tables 4 and 5.

[Evaluation Criteria for Damage Resistance]

4: The length of the peeled coating film from the center of the dropped weight is less than 1 mm on average 3: The above length is 1 mm or more and less than 3 mm on average 2: The above length is 5 mm or more and less than 10 mm on average 1: The above length is 10 mm or more on average <Antifouling Test>

To a sand-blasted steel panel (length 100 mm×width 70 mm×thickness 2.3 mm), an epoxy-based antirust paint (epoxy AC paint, trade name "Bannoh 1500", manufactured by Chugoku Marine Paints, Ltd.) was applied such that the thickness of the dry film thereof was about 100 μm. After drying for one day, an epoxy-based intermediate coating (trade name "Bannoh 1500R Z", manufactured by Chugoku Marine Paints, Ltd.) was applied thereon such that the thickness of the dry film thereof was about 100 μm, and was then dried for one day. Furthermore, the antifouling coating compositions obtained in Examples 1 to 39 and Comparative Examples 1 to 4 were applied thereon such that the thickness of the dry film was about 200 μm, and was then dried at 25° C. for 7 days to fabricate an antifouling test panel.

The antifouling test panel fabricated as described above was attached to a cylinder that rotated in Hiroshima Bay such that the surface of the test panel on which the antifouling coating film was formed had a speed of about 15 knots (kt), and while rotating at the speed, the antifouling test panel was immersed at a position about 1 meter below the surface of the water. The aquatic organism adhesion area on the antifouling coating film after 6 months from the start of immersion (dynamic 6 months) was measured, and the antifouling property of the antifouling coating film was evaluated according to the following [Evaluation Criteria for Antifouling Property Based On Aquatic Organism Adhesion Area]. The results are shown in Tables 4 and 5.

[Evaluation Criteria for Antifouling Property Based on Aquatic Organism Adhesion Area]

5: The total area of the antifouling test panel occupied by aquatic organisms is less than 1% of the entire antifouling coating film 4: The above area is 1% or more and less than 10% of the entire antifouling coating film 3: The above area is 10% or more and less than 30% of the entire antifouling coating film 2: The above area is 30% or more and less than 70% of the entire antifouling coating film 1: The above area is 70% or more of the entire antifouling coating film <Coating Film Gloss Test>

The surface-protective coating compositions obtained in Examples 40 to 58 and Comparative Examples 5 to 7 were applied to a calcium silicate panel (thickness: 5 mm) such that the thickness of the dry film thereof was about 300 μm, and was then dried at 25° C. for one day to fabricate a test panel for coating film gloss evaluation. The gloss of the fabricated test panel was measured using a gloss meter (Micro-TRI-gloss with standard holder, manufactured by BYK-Gardner GmbH) conforming to ISO2813, and the 85-degree gloss was used as an evaluation value. The results are shown in Table 6.

When a porous substrate such as a calcium silicate panel is coated with a coating composition, absorption (a phenomenon in which the coating composition is absorbed into the substrate) occurs, and the 85-degree gloss of the formed coating film tends to be low. Therefore, the topcoat coating composition is preferably a coating composition that exhibits high gloss in the present test.

<Coating Film Hardness Test>

The surface-protective coating compositions obtained in Examples 40 to 58 and Comparative Examples 5 and 6 were applied to a vinyl chloride panel (thickness: 5 mm) such that the thickness of the dry film thereof was about 100 μm, and were then dried at 25° C. for 7 days to fabricate a test panel for coating film hardness evaluation. The hardness of the fabricated test panel was measured using a pendulum hardness tester (manufactured by ERICHSEN GmbH & Co. KG, hardness tester pendulum 299 type, pendulum initial angle: 6) conforming to ISO1522 and was used as an evaluation value. The results are shown in Table 6.

A coating film with a high evaluation value in the present test has a high coating film hardness and tends to be less likely to be damaged when in contact with an object. The evaluation value of the topcoat coating composition is preferably 20 or more and 60 or less.

TABLE 4-1

| | | | Examples | | | | | | | | | | | | |
|---|---|---|---|---|---|---|---|---|---|---|---|---|---|---|---|
| | | | 1 | 2 | 3 | 4 | 5 | 6 | 7 | 8 | 9 | 10 | 11 | 12 | 13 |
| Blending amount (parts by mass) | (A) *1 | A-1 | 12.0 | | | | | | | | | | | | |
| | | A-2 | | 12.0 | | | | | | | | | | | |
| | | A-3 | | | 12.0 | | | | | | | | | | |
| | | A-4 | | | | 12.0 | | | | | | | | | |
| | | A-5 | | | | | 12.0 | | | | | | | | |
| | | A-6 | | | | | | 12.0 | | | | | | | |
| | | A-7 | | | | | | | 12.0 | | | | | | |
| | | A-8 | | | | | | | | 12.0 | | | | | |
| | | A-9 | | | | | | | | | 12.0 | | | | |
| | | A-10 | | | | | | | | | | 12.0 | | | |
| | | A-11 | | | | | | | | | | | 12.0 | | |
| | | A-12 | | | | | | | | | | | | 12.0 | |
| | | A-13 | | | | | | | | | | | | | 12.0 |
| | | A-14 | | | | | | | | | | | | | |
| | | A-15 | | | | | | | | | | | | | |
| | | A-16 | | | | | | | | | | | | | |
| | | A-17 | | | | | | | | | | | | | |
| | | A-18 | | | | | | | | | | | | | |
| | | A-19 | | | | | | | | | | | | | |
| | | A-20 | | | | | | | | | | | | | |
| | | A-21 | | | | | | | | | | | | | |
| | | A-22 | | | | | | | | | | | | | |
| | | J-1 | | | | | | | | | | | | | |
| | | J-2 | | | | | | | | | | | | | |
| | | J-3 | | | | | | | | | | | | | |
| | (B) | Zinc oxide | 5.0 | 5.0 | 5.0 | 5.0 | 5.0 | 5.0 | 5.0 | 5.0 | 5.0 | 5.0 | 5.0 | 5.0 | 5.0 |
| | (C) | Rosin | 12.0 | 12.0 | 12.0 | 12.0 | 12.0 | 12.0 | 12.0 | 12.0 | 12.0 | 12.0 | 12.0 | 12.0 | 12.0 |
| | (D) | Cuprous oxide | 38.0 | 38.0 | 38.0 | 38.0 | 38.0 | 38.0 | 38.0 | 38.0 | 38.0 | 38.0 | 38.0 | 38.0 | 38.0 |
| | | Copper pyrithione | 2.0 | 2.0 | 2.0 | 2.0 | 2.0 | 2.0 | 2.0 | 2.0 | 2.0 | 2.0 | 2.0 | 2.0 | 2.0 |
| | (E) | Red iron oxide | 2.0 | 2.0 | 2.0 | 2.0 | 2.0 | 2.0 | 2.0 | 2.0 | 2.0 | 2.0 | 2.0 | 2.0 | 2.0 |
| | | Talc | 3.0 | 3.0 | 3.0 | 3.0 | 3.0 | 3.0 | 3.0 | 3.0 | 3.0 | 3.0 | 3.0 | 3.0 | 3.0 |

TABLE 4-1-continued

| | | | Examples | | | | | | | | | | | | |
|---|---|---|---|---|---|---|---|---|---|---|---|---|---|---|---|
| | | | 1 | 2 | 3 | 4 | 5 | 6 | 7 | 8 | 9 | 10 | 11 | 12 | 13 |
| | (G) | Xylene | 17.0 | 17.0 | 17.0 | 17.0 | 17.0 | 17.0 | 17.0 | 17.0 | 17.0 | 17.0 | 17.0 | 17.0 | 17.0 |
| | | PGM | 7.0 | 7.0 | 7.0 | 7.0 | 7.0 | 7.0 | 7.0 | 7.0 | 7.0 | 7.0 | 7.0 | 7.0 | 7.0 |
| | (H) | Organic modified bentonite | 2.0 | 2.0 | 2.0 | 2.0 | 2.0 | 2.0 | 2.0 | 2.0 | 2.0 | 2.0 | 2.0 | 2.0 | 2.0 |
| | Total (parts by mass) | | 100.0 | 100.0 | 100.0 | 100.0 | 100.0 | 100.0 | 100.0 | 100.0 | 100.0 | 100.0 | 100.0 | 100.0 | 100.0 |
| | Solvent-soluble component acid value (mgKOH/g) | | 116.5 | 122.3 | 128.1 | 142.2 | 171.8 | 129.8 | 145.7 | 129.0 | 144.9 | 176.5 | 127.5 | 141.1 | 126.1 |
| Results | Coating film appearance | | 2 | 3 | 3 | 3 | 3 | 3 | 3 | 3 | 3 | 3 | 3 | 3 | 3 |
| | Damage resistance test | | 4 | 4 | 4 | 4 | 4 | 4 | 4 | 4 | 4 | 4 | 4 | 4 | 4 |
| | Antifouling property | | 3 | 3 | 3 | 4 | 5 | 4 | 5 | 4 | 4 | 5 | 4 | 5 | 4 |

*1: As a solvent, the xylene used in the production of the component (A) is included.

TABLE 4-2

| | | | Examples | | | | | | | | | Comparative Examples | | | |
|---|---|---|---|---|---|---|---|---|---|---|---|---|---|---|---|
| | | | 14 | 15 | 16 | 17 | 18 | 19 | 20 | 21 | 22 | 1 | 2 | 3 | 4 |
| Blending amount (parts by mass) | (A) *1 | A-1 | | | | | | | | | | | | | |
| | | A-2 | | | | | | | | | | | | | 12.0 |
| | | A-3 | | | | | | | | | | | | | |
| | | A-4 | | | | | | | | | | | | | |
| | | A-5 | | | | | | | | | | | | | |
| | | A-6 | | | | | | | | | | | | | |
| | | A-7 | | | | | | | | | | | | | |
| | | A-8 | | | | | | | | | | | | | |
| | | A-9 | | | | | | | | | | | | | |
| | | A-10 | | | | | | | | | | | | | |
| | | A-11 | | | | | | | | | | | | | |
| | | A-12 | | | | | | | | | | | | | |
| | | A-13 | | | | | | | | | | | | | |
| | | A-14 | 12.0 | | | | | | | | | | | | |
| | | A-15 | | 12.0 | | | | | | | | | | | |
| | | A-16 | | | 12.0 | | | | | | | | | | |
| | | A-17 | | | | 10.5 | | | | | | | | | |
| | | A-18 | | | | | 10.5 | | | | | | | | |
| | | A-19 | | | | | | 12.0 | | | | | | | |
| | | A-20 | | | | | | | 18.0 | | | | | | |
| | | A-21 | | | | | | | | 12.0 | | | | | |
| | | A-22 | | | | | | | | | 12.0 | | | | |
| | | J-1 | | | | | | | | | | 12.0 | | | |
| | | J-2 | | | | | | | | | | | 12.0 | | |
| | | J-3 | | | | | | | | | | | | 12.0 | |
| | (B) | Zinc oxide | 5.0 | 5.0 | 5.0 | 5.0 | 5.0 | 5.0 | 5.0 | 5.0 | 5.0 | 5.0 | 5.0 | 5.0 | |
| | (C) | Rosin | 12.0 | 12.0 | 12.0 | 12.0 | 12.0 | 12.0 | 12.0 | 12.0 | 12.0 | 12.0 | 12.0 | 12.0 | 12.0 |
| | (D) | Cuprous oxide | 38.0 | 38.0 | 38.0 | 38.0 | 38.0 | 38.0 | 38.0 | 38.0 | 38.0 | 38.0 | 38.0 | 38.0 | 43.0 |
| | | Copper pyrithione | 2.0 | 2.0 | 2.0 | 2.0 | 2.0 | 2.0 | 2.0 | 2.0 | 2.0 | 2.0 | 2.0 | 2.0 | 2.0 |
| | (E) | Red iron oxide | 2.0 | 2.0 | 2.0 | 2.0 | 2.0 | 2.0 | 2.0 | 2.0 | 2.0 | 2.0 | 2.0 | 2.0 | 2.0 |
| | | Talc | 3.0 | 3.0 | 3.0 | 3.0 | 3.0 | 3.0 | 3.0 | 3.0 | 3.0 | 3.0 | 3.0 | 3.0 | 3.0 |
| | (G) | Xylene | 17.0 | 17.0 | 17.0 | 18.5 | 18.5 | 17.0 | 11.0 | 17.0 | 17.0 | 17.0 | 17.0 | 17.0 | 17.0 |
| | | PGM | 7.0 | 7.0 | 7.0 | 7.0 | 7.0 | 7.0 | 7.0 | 7.0 | 7.0 | 7.0 | 7.0 | 7.0 | 7.0 |
| | (H) | Organic modified bentonite | 2.0 | 2.0 | 2.0 | 2.0 | 2.0 | 2.0 | 2.0 | 2.0 | 2.0 | 2.0 | 2.0 | 2.0 | 2.0 |
| | Total (parts by mass) | | 100.0 | 100.0 | 100.0 | 100.0 | 100.0 | 100.0 | 100.0 | 100.0 | 100.0 | 100.0 | 100.0 | 100.0 | 100.0 |
| | Solvent-soluble component acid value (mgKOH/g) | | 138.5 | 126.7 | 139.7 | 119.6 | 125.5 | 125.9 | 127.1 | 140.4 | 125.8 | 192.9 | 115.2 | 113.4 | 122.3 |
| Results | Coating film appearance | | 3 | 3 | 3 | 3 | 3 | 3 | 3 | 3 | 3 | 1 | 1 | 1 | 1 |
| | Damage resistance test | | 3 | 4 | 4 | 2 | 4 | 4 | 3 | 4 | 4 | 4 | 1 | 2 | 2 |
| | Antifouling property | | 4 | 4 | 5 | 3 | 4 | 4 | 4 | 4 | 3 | 3 | 3 | 2 | 1 |

*1: As a solvent, the xylene used in the production of the component (A) is included.

TABLE 5

| | | | Examples | | | | | | | | |
|---|---|---|---|---|---|---|---|---|---|---|---|
| | | | 23 | 24 | 25 | 26 | 27 | 28 | 29 | 30 | 31 |
| Blending amount (parts by mass) | (A) *1 | A-6 | | | | | | | | | |
| | | A-7 | 18.0 | 18.0 | 18.0 | 12.0 | 12.0 | 12.0 | 12.0 | 12.0 | 12.0 |
| | | A-10 | | | | | | | | | |
| | | A-19 | | | | | | | | | |
| | | A-20 | | | | | | | | | |
| | (B) | Zinc oxide | 5.0 | 5.0 | 5.0 | 5.0 | 5.0 | 5.0 | 5.0 | 5.0 | 5.0 |
| | (C) | Rosin | 9.0 | 9.0 | 9.0 | 12.0 | 12.0 | 12.0 | 12.0 | 12.0 | 12.0 |
| | (D) | Cuprous oxide | 38.0 | 38.0 | 38.0 | 38.0 | 38.0 | 38.0 | 38.0 | 38.0 | 38.0 |
| | | Copper pyrithione | 2.0 | 2.0 | 2.0 | 2.0 | 2.0 | 2.0 | 2.0 | 2.0 | 2.0 |
| | | Zinc pyrithione | | | | | | | | | |
| | | DCOIT | | 1.0 | | | | | | | |
| | | Tralopyril | | | | | | | | | |
| | | Medetomidine | | | 0.5 | | | | | | |
| | (E) | Red iron oxide | 2.0 | 2.0 | 2.0 | 2.0 | 2.0 | 2.0 | 2.0 | 2.0 | 2.0 |
| | | Organic red pigment | | | | 0.5 | | | | | |
| | | Titanium oxide | | | | 3.0 | | | | | |
| | | Barium sulfate | | | | | | | | | |
| | | Talc | 3.0 | 3.0 | 3.0 | | 3.0 | 3.0 | 3.0 | 3.0 | 3.0 |
| | (G) | Xylene | 14.0 | 13.0 | 13.5 | 16.5 | 17.0 | 17.0 | 17.0 | 15.0 | 15.0 |
| | | PGM | 7.0 | 7.0 | 7.0 | 7.0 | | 7.0 | 7.0 | 7.0 | 7.0 |
| | | n-butanol | | | | | 7.0 | | | | |
| | (H) | Organic modified bentonite | 2.0 | 2.0 | 2.0 | 2.0 | 2.0 | | | 2.0 | 2.0 |
| | | Organic hectorite clay | | | | | | 2.0 | | | |
| | | Fumed silica | | | | | | | 2.0 | | |
| | (I) | TCP | | | | | | | | 2.0 | |
| | | Mixed dibasic acid ester | | | | | | | | | 2.0 |
| | Total (parts by mass) | | 100.0 | 100.0 | 100.0 | 100.0 | 100.0 | 100.0 | 100.0 | 100.0 | 100.0 |
| | Solvent-soluble component acid value (mgKOH/g) | | 133.4 | 131.1 | 133.4 | 145.7 | 145.7 | 145.7 | 145.7 | 145.7 | 145.7 |
| Results | Coating film appearance | | 3 | 3 | 3 | 3 | 3 | 3 | 3 | 3 | 3 |
| | Damage resistance test | | 4 | 4 | 4 | 4 | 4 | 4 | 4 | 4 | 4 |
| | Antifouling property | | 4 | 5 | 5 | 5 | 5 | 5 | 5 | 5 | 5 |

| | | | Examples | | | | | | | |
|---|---|---|---|---|---|---|---|---|---|---|
| | | | 32 | 33 | 34 | 35 | 36 | 37 | 38 | 39 |
| Blending amount (parts by mass) | (A) *1 | A-6 | 12.0 | 15.0 | | | | | | |
| | | A-7 | | | 15.0 | | | | 15.0 | 15.0 |
| | | A-10 | | | | 15.0 | | | | |
| | | A-19 | | | | | 15.0 | | | |
| | | A-20 | | | | | | 22.5 | | |
| | (B) | Zinc oxide | 20.0 | 20.0 | 20.0 | 20.0 | 20.0 | 20.0 | 20.0 | 20.0 |
| | (C) | Rosin | 12.0 | 7.5 | 7.5 | 7.5 | 7.5 | 7.5 | 7.5 | 7.5 |
| | (D) | Cuprous oxide | | | | | | | | |
| | | Copper pyrithione | 8.0 | | | | | | | |
| | | Zinc pyrithione | | 8.0 | 8.0 | 8.0 | 8.0 | 8.0 | 8.0 | 8.0 |
| | | DCOIT | | 1.0 | 1.0 | 1.0 | 1.0 | 1.0 | | |
| | | Tralopyril | | | | | | | 4.0 | |
| | | Medetomidine | 0.5 | | | | | | | 0.5 |
| | (E) | Red iron oxide | 2.0 | 1.5 | 1.5 | 1.5 | 1.5 | 1.5 | 1.5 | 1.5 |
| | | Organic red pigment | | 0.5 | 0.5 | 0.5 | 0.5 | 0.5 | 0.5 | 0.5 |
| | | Titanium oxide | | | | | | | | |
| | | Barium sulfate | 15.0 | 16.0 | 16.0 | 16.0 | 16.0 | 16.0 | 12.0 | 16.0 |
| | | Talc | 3.0 | 3.0 | 3.0 | 3.0 | 3.0 | 3.0 | 3.0 | 3.0 |
| | (G) | Xylene | 17.5 | 19.0 | 19.0 | 19.0 | 19.0 | 11.5 | 20.0 | 19.5 |
| | | PGM | 8.0 | 7.5 | 7.5 | 7.5 | 7.5 | 7.5 | 7.5 | 7.5 |
| | | n-butanol | | | | | | | | |
| | (H) | Organic modified bentonite | 2.0 | 1.0 | 1.0 | 1.0 | 1.0 | 1.0 | 1.0 | 1.0 |
| | | Organic hectorite clay | | | | | | | | |
| | | Fumed silica | | | | | | | | |
| | (I) | TCP | | | | | | | | |
| | | Mixed dibasic acid ester | | | | | | | | |
| | Total (parts by mass) | | 100.0 | 100.0 | 100.0 | 100.0 | 100.0 | 100.0 | 100.0 | 100.0 |
| | Solvent-soluble component acid value (mgKOH/g) | | 129.8 | 107.3 | 130.7 | 176.2 | 101.6 | 103.5 | 133.4 | 133.4 |
| Results | Coating film appearance | | 3 | 3 | 3 | 3 | 3 | 3 | 3 | 3 |
| | Damage resistance test | | 3 | 4 | 4 | 4 | 3 | 4 | 3 | 4 |
| | Antifouling property | | 4 | 4 | 4 | 5 | 4 | 4 | 4 | 4 |

*1: As a solvent, the xylene used in the production of the component (A) is included.

TABLE 6-1

| | | | Examples | | | | | | | | | | |
|---|---|---|---|---|---|---|---|---|---|---|---|---|---|
| | | | 40 | 41 | 42 | 43 | 44 | 45 | 46 | 47 | 48 | 49 | 50 |
| Blending amount (parts by mass) | (A) *1 | A-3 | 22.0 | 22.0 | 22.0 | | | | | | | | |
| | | A-6 | | | | 22.0 | 22.0 | 22.0 | | | | | |
| | | A-7 | | | | | | | 22.0 | | | | |
| | | A-9 | | | | | | | | 22.0 | 22.0 | | |
| | | A-11 | | | | | | | | | | 22.0 | |
| | | A-15 | | | | | | | | | | | 22.0 |
| | | A-16 | | | | | | | | | | | |
| | | A-17 | | | | | | | | | | | |
| | | A-21 | | | | | | | | | | | |
| | | J-2 | | | | | | | | | | | |
| | (B) | Zinc oxide | 1.0 | 2.0 | 3.0 | 3.0 | 3.0 | 3.0 | 5.0 | 5.0 | 5.0 | 2.0 | 1.0 |
| | (C) | Rosin | 11.0 | 11.0 | 11.0 | 11.0 | | | 11.0 | 11.0 | | 11.0 | 11.0 |
| | | Benzoic acid | | | | | 4.0 | 4.0 | | | 8.0 | | |
| | (E) | Titanium oxide | 20.0 | 20.0 | 20.0 | 20.0 | 20.0 | 20.0 | 20.0 | 20.0 | 20.0 | 20.0 | 20.0 |
| | | Barium sulfate | 13.0 | 13.0 | 13.0 | 13.0 | 13.0 | 13.0 | 13.0 | 13.0 | 13.0 | 13.0 | 13.0 |
| | | Calcium carbonate | 2.0 | 2.0 | 2.0 | 2.0 | 2.0 | 2.0 | 2.0 | 2.0 | 2.0 | 2.0 | 2.0 |
| | (G) | Xylene | 11.5 | 10.5 | 9.5 | 9.5 | 16.5 | 16.5 | 7.5 | 7.5 | 10.5 | 10.5 | 11.5 |
| | | PGM | 17.0 | 17.0 | 17.0 | 17.0 | 17.0 | 17.0 | 17.0 | 17.0 | 17.0 | 17.0 | 17.0 |
| | (H) | Organic modified bentonite | 1.5 | 1.5 | 1.5 | 1.5 | 1.5 | 1.5 | 1.5 | 1.5 | 1.5 | 1.5 | 1.5 |
| | (I) | TCP | 1.0 | 1.0 | 1.0 | 1.0 | 1.0 | | 1.0 | 1.0 | 1.0 | 1.0 | 1.0 |
| | | Mixed dibasic acid ester | | | | | | 1.0 | | | | | |
| | Total (parts by mass) | | 100.0 | 100.0 | 100.0 | 100.0 | 100.0 | 100.0 | 100.0 | 100.0 | 100.0 | 100.0 | 100.0 |
| Solvent-soluble component acid value (mgKOH/g) | | | 102.4 | 102.4 | 102.4 | 104.7 | 149.0 | 149.0 | 127.3 | 126.6 | 235.9 | 101.6 | 100.2 |
| Results | Coating film appearance | | 3 | 3 | 3 | 3 | 3 | 3 | 3 | 3 | 3 | 3 | 3 |
| | Coating film gloss (85° calcium silicate panel) | | 10.6 | 24.0 | 23.6 | 18.5 | 11.4 | 11.2 | 28.5 | 32.0 | 20.8 | 30.8 | 10.6 |
| | Coating film hardness | | 22 | 59 | 41 | 58 | 41 | 40 | 33 | 49 | 47 | 42 | 27 |

*1: As a solvent, the xylene used in the production of the component (A) is included.

TABLE 6-2

| | | | Examples | | | | | | | | Comparative Examples | |
|---|---|---|---|---|---|---|---|---|---|---|---|---|
| | | | 51 | 52 | 53 | 54 | 55 | 56 | 57 | 58 | 5 | 6 |
| Blending amount (parts by mass) | (A) *1 | A-3 | | | | | | | | | | |
| | | A-6 | | | | | | | | | | |
| | | A-7 | | | | | | | | | | |
| | | A-9 | | | | | | | | | | |
| | | A-11 | | | | | | | | | | |
| | | A-15 | 22.0 | 22.0 | 22.0 | | | | | | | |
| | | A-16 | | | | 22.0 | 22.0 | 22.0 | | | | 22.0 |
| | | A-17 | | | | | | | 22.0 | | | |
| | | A-21 | | | | | | | | 22.0 | | |
| | | J-2 | | | | | | | | | 22.0 | |
| | (B) | Zinc oxide | 2.0 | 3.0 | 5.0 | 2.0 | 3.0 | 5.0 | 2.0 | 2.0 | 2.0 | |
| | (C) | Rosin | 11.0 | 11.0 | 11.0 | 11.0 | 11.0 | 11.0 | 11.0 | 11.0 | 11.0 | 11.0 |
| | | Benzoic acid | | | | | | | | | | |
| | (E) | Titanium oxide | 20.0 | 20.0 | 20.0 | 20.0 | 20.0 | 20.0 | 20.0 | 20.0 | 20.0 | 20.0 |
| | | Barium sulfate | 13.0 | 13.0 | 13.0 | 13.0 | 13.0 | 13.0 | 13.0 | 13.0 | 13.0 | 13.0 |
| | | Calcium carbonate | 2.0 | 2.0 | 2.0 | 2.0 | 2.0 | 2.0 | 2.0 | 2.0 | 2.0 | 2.0 |
| | (G) | Xylene | 10.5 | 9.5 | 7.5 | 10.5 | 9.5 | 8.5 | 10.5 | 10.5 | 10.5 | 12.5 |
| | | PGM | 17.0 | 17.0 | 17.0 | 17.0 | 17.0 | 16.0 | 17.0 | 17.0 | 17.0 | 17.0 |
| | (H) | Organic modified bentonite | 1.5 | 1.5 | 1.5 | 1.5 | 1.5 | 1.5 | 1.5 | 1.5 | 1.5 | 1.5 |
| | (I) | TCP | 1.0 | 1.0 | 1.0 | 1.0 | 1.0 | 1.0 | 1.0 | 1.0 | 1.0 | 1.0 |
| | | Mixed dibasic acid ester | | | | | | | | | | |
| | Total (parts by mass) | | 100.0 | 100.0 | 100.0 | 100.0 | 100.0 | 100.0 | 100.0 | 100.0 | 100.0 | 100.0 |
| Solvent-soluble component acid value (mgKOH/g) | | | 100.2 | 100.2 | 100.2 | 118.8 | 118.8 | 118.8 | 85.7 | 120.0 | 83.2 | 118.8 |
| Results | Coating film appearance | | 3 | 3 | 3 | 3 | 3 | 3 | 3 | 3 | 1 | 1 |
| | Coating film gloss (85° calcium silicate panel) | | 12.3 | 11.6 | 13.2 | 14.7 | 21.0 | 21.9 | 12.4 | 45.7 | 9.3 | 5.1 |
| | Coating film hardness | | 46 | 52 | 56 | 54 | 56 | 41 | 48 | 45 | 22 | 2 |

*1: As a solvent, the xylene used in the production of the component (A) is included.

TABLE 7

| | | | Examples | | Comparative Examples | |
|---|---|---|---|---|---|---|
| | | | 59 | 60 | 7 | 8 |
| Blending amount (parts by mass) | (A) *1 | A-3 | | | | |
| | | A-7 | 14.0 | | | 14.0 |
| | | A-8 | | 14.0 | | |
| | | J-2 | | | 14.0 | |
| | (B) | Zinc oxide | 3.0 | 5.0 | 3.0 | |
| | (C) | Rosin | 7.0 | 7.0 | 7.0 | 7.0 |
| | (E) | Titanium oxide | 9.0 | 9.0 | 9.0 | 9.0 |
| | | Calcium carbonate | 45.0 | 43.0 | 45.0 | 48.0 |
| | (G) | Xylene | 10.0 | 10.0 | 10.0 | 10.0 |
| | | PGM | 7.0 | 7.0 | 7.0 | 7.0 |
| | (H) | Organic modified bentonite | 2.0 | 2.0 | 2.0 | 2.0 |
| | (I) | ATEHC | 3.0 | 3.0 | 3.0 | 3.0 |
| | Total (parts by mass) | | 100.0 | 100.0 | 100.0 | 100.0 |
| Solvent-soluble component acid value (mgKOH/g) | | | 90.0 | 109.5 | 71.4 | 90.0 |
| Results | Coating film appearance | | 3 | 3 | 1 | 1 |

*1: As a solvent, the xylene used in the production of the component (A) is included.

It can be seen that the polymer (A) used in the present invention has marine biodegradability, and the occurrence of cracks of the coating film formed from the coating composition containing the polymer (A) and the zinc oxide (B) is suppressed.

The invention claimed is:

1. A surface-protective coating composition, comprising:

a polycaprolactone-based polymer (A); and a zinc oxide (B);

wherein:

the polycaprolactone-based polymer (A) has an acid value of 5 mgKOH/g or more and 200 mgKOH/g or less;

the polycaprolactone-based polymer (A) is a polymer obtained by a polymerization reaction of ε-caprolactone using a carboxylic acid compound (a) as an initiator; and a structural unit derived from caprolactone is present in the polycaprolactone-based polymer (A) at a content of 75% by mass or more and 99.5% by mass or less.

2. The surface-protective coating composition according to claim 1, wherein, in polymer components contained in the surface-protective coating composition, the polycaprolactone polymer (A) has a content of 50% by mass or more.

3. The surface-protective coating composition according to claim 1, wherein the polycaprolactone-based polymer (A) has a weight average molecular weight (Mw) of 1,500 or more and 50,000 or less.

4. The surface-protective coating composition according to claim 1, wherein the zinc oxide (B) is present at a content of 0.5% by mass or more and 80% by mass or less in a solid content of the surface-protective coating composition.

5. The surface-protective coating composition according to claim 1, wherein a solvent-soluble component of the surface-protective coating composition has an acid value of 10 mgKOH/g or more and 500 mgKOH/g or less.

6. The surface-protective coating composition according to claim 1, which is an antifouling coating composition.

7. A surface-protective coating film formed from the surface-protective coating composition according to claim 1.

8. A substrate with a surface-protective coating film, which is coated with the surface-protective coating film according to claim 7.

9. The substrate with a surface-protective coating film according to claim 8, wherein the substrate is a substrate in contact with water.

10. A method of producing a substrate with a surface-protective coating film, comprising the following steps [1] and [2].

[1] applying the surface-protective coating composition according to claim 1 to a substrate; and

[2] forming a coating film by drying the surface-protective coating composition applied to the substrate.

11. A surface protection method using the surface-protective coating film according to claim 7.

12. The surface-protective coating composition according to claim 1, comprising an organic solvent.

* * * * *